(12) United States Patent
Mae et al.

(10) Patent No.: US 7,706,667 B2
(45) Date of Patent: Apr. 27, 2010

(54) RECORDING APPARATUS AND METHOD, REPRODUCING APPARATUS AND METHOD, RECORDING MEDIUM, AND PROGRAM

(75) Inventors: Atsushi Mae, Tokyo (JP); Kenichiro Aridome, Kanagawa (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1010 days.

(21) Appl. No.: 10/572,791

(22) PCT Filed: Jun. 21, 2005

(86) PCT No.: PCT/JP2005/011335

§ 371 (c)(1),
(2), (4) Date: Mar. 21, 2006

(87) PCT Pub. No.: WO2006/022069

PCT Pub. Date: Mar. 2, 2006

(65) Prior Publication Data

US 2008/0247732 A1    Oct. 9, 2008

(30) Foreign Application Priority Data

Aug. 23, 2004  (JP)  ............................ 2004-241882

(51) Int. Cl.
  H04N 7/00    (2006.01)
  H04N 7/26    (2006.01)
(52) U.S. Cl. ......................................... 386/98; 386/109
(58) Field of Classification Search .................. 386/98, 386/109, 111, 112, 124, 125, 46
See application file for complete search history.

(56) References Cited

U.S. PATENT DOCUMENTS 5,377,051 A * 12/1994 Lane et al. ..................... 386/81
2004/0126097 A1   7/2004 Aridome

FOREIGN PATENT DOCUMENTS

JP  07-170490       7/1995
JP  11-312381 A    11/1999

(Continued)

OTHER PUBLICATIONS

Japanese Office Action issued Jan. 13, 2009 for corresponding Japanese Application No. 2004-241882.

(Continued)

*Primary Examiner*—Robert Chevalier
(74) *Attorney, Agent, or Firm*—Rader, Fishman & Grauer PLLC

(57) ABSTRACT

The present invention relates to a recording apparatus and method, a reproducing apparatus and method, a recording medium, and a program for reproducing a video stream in a simpler method. A VOBU of an AV stream recorded on a recording medium includes, from the beginning thereof, navigation information, and then provider definition information followed by V_PCK, A_PCK, and S_PCK. The provider definition information contains closed GOP flag information, broken link flag, and I picture reproduction order information, the number of real frames, the number of reproduction frames, and progressive frame flag, related to the video data contained in the VOBU. A reproducing apparatus performs a reproduction process based on the provider definition information. The present invention is applicable to a reproducing apparatus of DVD.

16 Claims, 16 Drawing Sheets

FOREIGN PATENT DOCUMENTS

| | | |
|---|---|---|
| JP | 2003-533073 | 5/2003 |
| WO | WO-01/35647 | 5/2001 |
| WO | WO 01/35650 | 5/2001 |
| WO | WO-01/35650 A1 | 5/2001 |

OTHER PUBLICATIONS

International Search Report mailed Oct. 11, 2005.

International Written Opinion mailed Oct. 11, 2005.

Danish Search Report and Written Opinion dated Nov. 20, 2006 for corresponding Singapore Application No. 200602644-7.

Supplemental European Search Report dated Oct. 22, 2008 for corresponding European Application No. 05 75 3494.

Japanese Office Action issued Dec. 10, 2009 for corresponding Japanese Application No. 2004-241882.

* cited by examiner

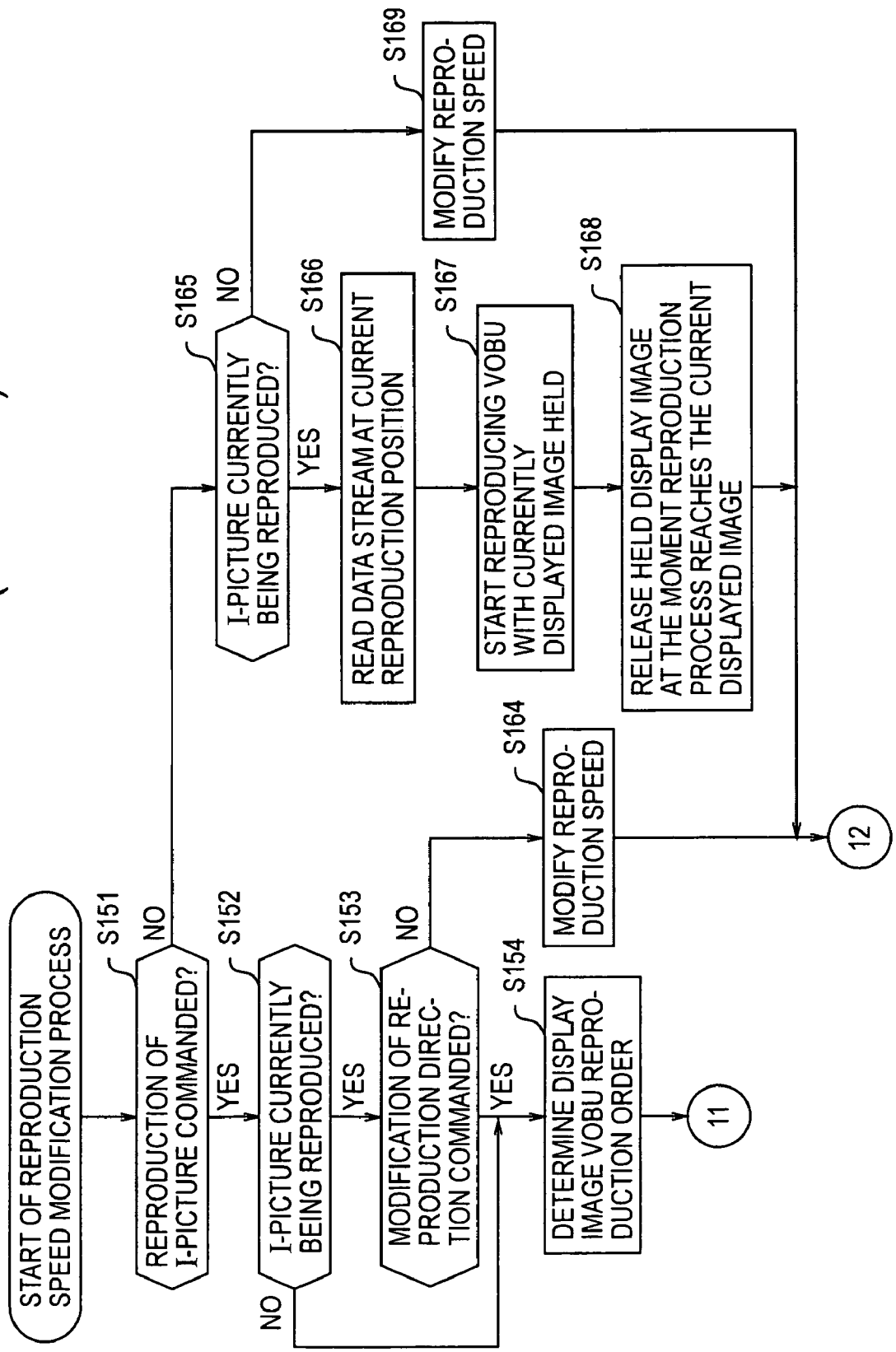
FIG. 16(FIG. 16-1)

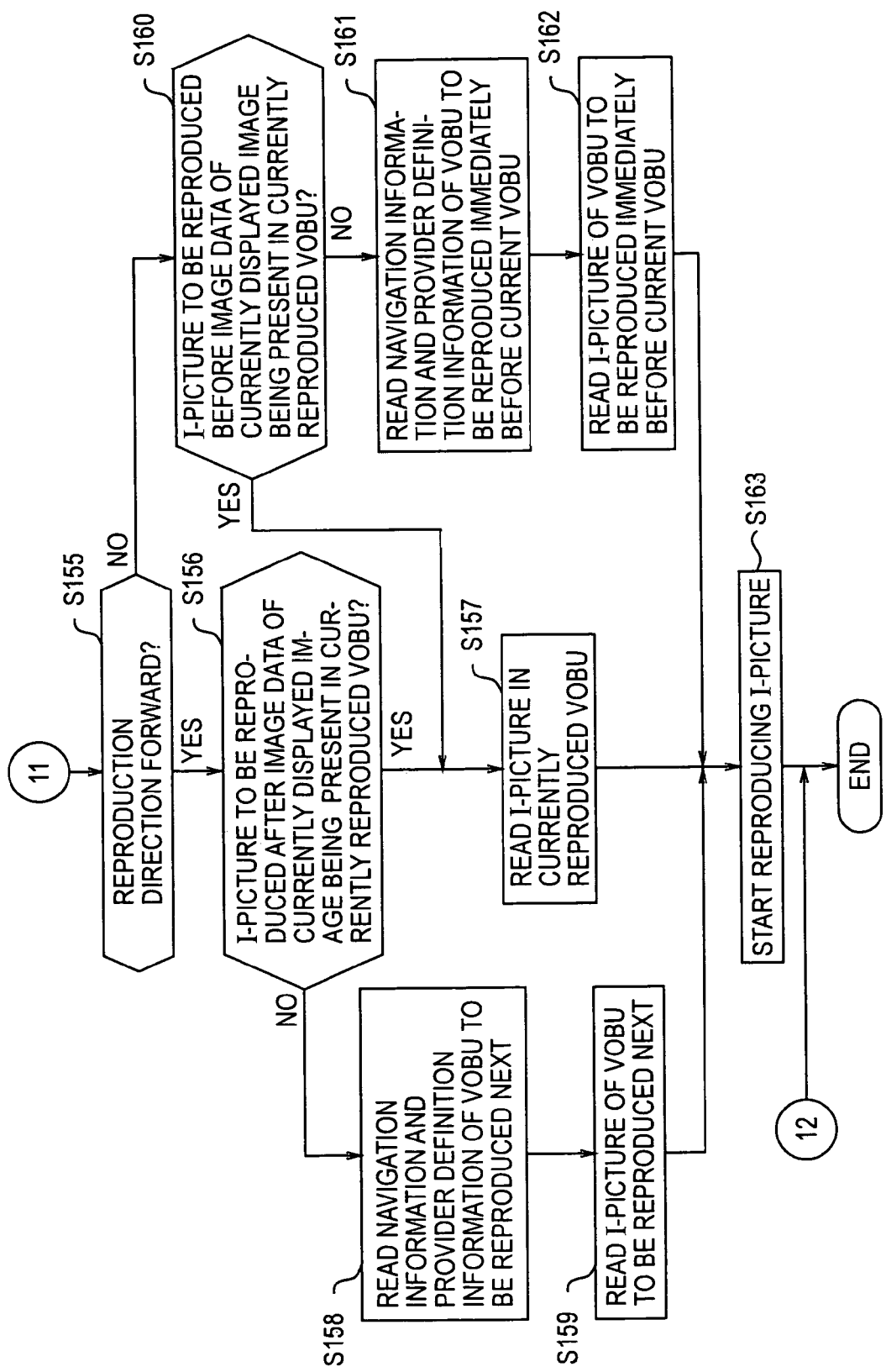
FIG. 17(FIG. 16-2)

RECORDING APPARATUS AND METHOD, REPRODUCING APPARATUS AND METHOD, RECORDING MEDIUM, AND PROGRAM

TECHNICAL FIELD

The present invention relates to a recording apparatus and method, a reproducing apparatus and method, a recording medium, and a program and to a recording apparatus and method, a reproducing apparatus and method, a recording medium and a program for recording data to and reproducing data from a data recording medium.

BACKGROUND ART

Available as standards for recording formats for DVD (Digital Versatile Disk) are DVD-Video, and DVD-Video Recording (DVD-VR). In each of the recording formats, a video stream encoded in accordance with MPEG (Moving Picture Experts Group), an audio stream, and sub-picture data such as subtitle data are multiplexed in accordance with MPEG 2 system. An AV (Audio Visual) stream of MPEG 2-PS (Program Stream) data is generated and the generated AV stream is recorded on a DVD.

In each of the recording formats, the recording of the AV stream onto the DVD and the reading of the AV stream from the DVD are performed on a per VOBU (Video Object Unit) basis. The VOBU contains navigation information containing control information related to reproduction and displaying of and accessing to data in the VOBU, and at least one GOP (Group of pictures). In the following discussion, it is assumed that one GOP is contained in one VOBU.

The GOP is a set of video data of at least one page contained in the video stream multiplexed into the AV stream. Editing of the video stream and random accessing of a reproducing apparatus to the video stream are performed on a per GOP unit basis. The video data herein refers to data of one frame of video stream. The reproduction time of one GOP is about 0.5 second, for example.

The video data contained in the GOP includes three types, namely, I pictures (intra-picture, intra-coded picture, and intra-frame coded picture), P pictures (predictive picture, predictive coded picture, and inter-frame forward predictive coded picture), and B pictures (bidirectionally predictive picture, and bidirectionally predictive coded picture).

The I picture is video data that has been intra-frame encoded separately from other video data (pictures). The I picture can be decoded without the other video data. When accessing the GOP contained in the video stream recorded on DVD, a reproducing apparatus of DVD accesses the I picture in the GOP. The reproducing apparatus accesses the I picture in the GOP to reproduce the I picture, for example, when the reproducing apparatus accesses any GOP for reproduction regardless of a predetermined reproduction order or when the reproducing apparatus reproduces intermittently the video data in the video stream during fast forward reproduction mode.

The P picture is video data that has been encoded (inter-frame forward predictive encoded) using the I picture or the P picture present in past in time axis of the video stream. To decode the P picture, the video data that has been used in encoding needs to be used. The B picture is video data that has been encoded (inter-frame bidirectionally predictive encoded) using the I picture or the P picture present in past and future in time axis of the video stream. To decode the P picture, the video data that has been used in encoding needs to be used. Each of the P picture and the B picture is encoded using a maximum of two pages of other video data.

To decode the video data contained in the GOP, values of two types of flags, namely, a closed GOP flag and a broken link flag are recorded on each GOP as information indicating whether the video data of another GOP is to be used. The closed GOP flag and the broken link flag are described below with reference to FIGS. 1 through 3.

The closed GOP flag indicates whether the video data of interest was encoded using the video data of own GOP only rather than using the video data of an immediately prior GOP. As shown in FIG. 1, a first B picture 11-1 and a second B picture 11-2 of a GOP 1-2 are encoded using an I picture 12-1 of the GOP 1-2, and the video data of the GOP 1-2 is not encoded using the video data of an immediately prior GOP 1-1. In this case, the value of the closed GOP flag of the GOP 1-2 is set to "1".

If a first B picture 11-3 and a second B picture 11-4 of a GOP 1-4 are encoded using a P picture 13-1 of an immediately prior GOP 1-3 and an I picture 12-2 of the GOP 1-4 as shown in FIG. 2, the closed GOP flag of the GOP 1-4 has a value of "0".

For example, if the editing of the AV stream causes a GOP 1-6 to be preceded by a GOP 1-5, which is different from the one that has been used in the encoding of the video data of the GOP 1-6, the broken link flag of the GOP 1-6 has a value "1". When the video data of the GOP 1-6 is decoded, the video data of the immediately prior GOP 1-5 cannot be used (referenced). For example, the broken link flag set to a value "1" means that two first pictures 14-1 and 14-2 of the GOP 1-6 were encoded using the video data of a GOP that had been present before the GOP 1-5. In such a case, the reproducing apparatus cannot decode the pictures 14-1 and 14-2, and the reproduction of the pictures 14-1 and 14-2 becomes unnecessary.

To decode the video data contained in a GOP of interest, whether the video data of the immediately prior GOP is required or not is determined based on the values of the closed GOP flag and the broken link flag of the GOP of interest. If the closed GOP flag has a value of "1" as shown in FIG. 1 or if the broken link flag has a value of "1" as shown in FIG. 3, the video data of the immediately prior GOP is determined as being unnecessary. If the closed GOP flag has a value of "0" and the broken link flag has a value of "0" as shown in FIG. 2, the video data of the immediately prior GOP is determined as being necessary. When the reproduction of the AV stream is started, the reproducing apparatus determines whether the VOBU containing the immediately prior GOP needs to be read from the DVD by referencing the values of the closed GOP flag and the broken link flag at a reproduction start position.

The value of a progressive frame flag indicating which scanning method, interlace scanning method or progressive (non-interlace) method, the video data of the GOP is written with is recorded in each unit of video data of the GOP. If the video data is recorded using the progressive method, the progressive frame flag is turned on, and if the video data is recorded using interlace method, the progressive frame flag is turned off. For example, the reproducing apparatus repeatedly displays a video of the same frame during a slow reproduction mode or a pause of the video. If the video data recorded with the interlace method is displayed, the reproducing apparatus displays an upper field and a lower field, thereby displaying a flickering image. To prevent the video from flickering, the upper field and the lower field are synthesized into a video signal in an inter-field interpolation process. A field-interpolated video signal is thus output.

The DVD reproducing apparatus performs a reproduction process by selecting in accordance with reproduction speed between reproducing all video data (frames) contained in the GOP (hereinafter referred to as all-frame reproduction) and reproducing successively I pictures only contained in the GOP (hereinafter referred to as I picture reproduction).

In the DVD reproducing apparatus, a processor controlling the reproduction process assigns a counter counting the serial number starting with 0 (hereinafter referred to as a reproduction frame counter) to the video data during the reproduction process, and manages, on a per VOBU basis, the range of the count of the reproduction frame-counter of the video data contained in the VOBU. A decoder of the reproducing apparatus manages a counter counting the total number of frames of the video outwardly output (video displayed) (hereinafter referred to as an output frame counter). By retrieving the count of the output frame counter from the decoder, the processor acquires information regarding which VOBU the video data of the currently output (displayed) video is contained in.

Furthermore, in a proposed synchronization reproduction method (for example, Patent Document 1), data of moving image information compressed at a high efficiency in accordance with MPEG 1 method, and compressed audio data accompanying the moving image data are reproduced in well-synchronized state.

[Patent Document 1] Japanese Unexamined Patent Application Publication No. 7-170490

DISCLOSURE OF THE INVENTION

Problems to be Solved by the Invention

The closed GOP flag and the broken link flag are recorded in a GOP layer in the data structure defined by MPEG 2, and the progressive frame flag is recorded in a picture layer in the data structure defined by MPEG 2. To retrieve the closed GOP flag, the broken link flag, and the progressive frame flag, the AV stream needs to be demultiplexed into a video stream, an audio stream, and a sub-picture stream, and further the video stream needs to be decoded. Therefore, the flags cannot be retrieved in a simple process.

For this reason, it takes time for the known reproducing apparatuses to retrieve the values of the closed GOP flag and the broken link flag of the GOP of the VOBU at a reproduction position at the start of the AV stream. It is now assumed that the GOP of the VOBU immediately prior to the reproduction position needs to be used to decode the video data of the GOP of the VOBU at the reproduction position. The VOBU immediately prior to the reproduction position is read and reproduced after retrieving the values of the closed GOP flag and the broken link flag of the GOP of the VOBU at the reproduction position. After that, the VOBU at the reproduction position is decoded again based on the VOBU (GOP) immediately prior to the reproduction position, and the VOBU is then reproduced. The displaying of the video is thus delayed.

To expedite the displaying of video, the reproduction process may be always started with the VOBU immediately prior to the reproduction position without referencing the values of the closed GOP flag and the broken link flag of the VOBU at the reproduction position. In this arrangement, however, the displaying of video is delayed by time required to read and reproduce the VOBU immediately prior to the reproduction position even if the use of the GOP of the VOBU immediately prior to the reproduction position is not necessary to decode the video data of the GOP of the VOBU at the reproduction position.

In the known reproducing apparatus, whether the scanning method of the video stream is switched form the progressive method to the interlace method is not known until the video data with the scanning method thereof switched is decoded. For this reason, the field interpolation process cannot be performed in time, and the video signal based on the interlace method is output as is. The resulting image thus flickers. The video signal may be output after the field interpolation process is performed on the vide signal at the switching of scanning method. In this arrangement, the field interpolation is performed after determining whether to perform the field interpolation process. The outputting of the video signal is delayed, and the displaying of the video is also delayed.

The MPEG 2 standard fails to specify information regarding the frame at which the I picture is in the GOP. The GOP needs to be reproduced from the beginning thereof to know whether the I picture contained in the GOP can be reproduced or not in a frame prior to or a frame subsequent to the video data of a currently reproduced image of the GOP. The process of knowing whether the I picture can be reproduced or not is not so simple.

For example, the mode is now changed from the all-frame reproduction to the I picture reproduction in response to a modification in reproduction speed. If the reproduction direction is forward (in the direction toward the future in time axis) and if an I picture to be reproduced subsequent to the video data of a currently displayed image is present in the GOP containing the video data of the currently displayed image, that I picture needs to be displayed. Since it takes time for the known reproducing apparatus to learn whether there is present an I picture subsequent to the video data of the currently displayed image, an I picture of the GOP to be reproduced next is reproduced. More specifically, if an I picture is present subsequent to the video data of the currently displayed image in the GOP containing the video data of the currently displayed image, that I picture is always skipped from the reproduction process, and an otherwise reliably displayed image is poorly displayed. The same is true of the video data if the reproduction direction is reverse (in the direction to the past in the time axis).

The MPEG 2 standard fails to specify information regarding the number of pages (frames) of the video data contained in each VOBU. In the known reproducing apparatus, the processor determines the count of the reproduction frame counter by calculating the number of frames of the video data contained in the GOP from the reproduction time of the GOP.

When the video stream of MPEG 2 is reproduced, the reproduction of the same video data is sometimes repeated. For example, 10 frames of the video data of a sixth page of a GOP containing six pages of video data are repeatedly reproduced, and a video of a total of 15 frames may reproduced for the one GOP. In such a case, the number of pages of video data actually contained in the GOP becomes different from the number of frames reproduced from that GOP, namely, the count of the reproduction frame counter. For this reason, in the known reproducing apparatus, the decoder learns the number of pages of video data actually contained in the reproduced GOP (VOBU) by counting the number of pages of the actually decoded video data (hereinafter a process frame counter). Since the decoder frequently notifies the count of the process frame counter, the processor thus recognizes the difference between the count of the reproduction frame counter and the count of the process frame counter.

The known reproducing apparatus cannot determines the count of the reproduction frame counter and the process frame counter in a simple way, and the process involved in the determination of the counts becomes complex.

The Patent Document 1 fails to disclose the retrieval of the closed GOP flag, the broken link flag, and the progressive frame flag, information regarding at what frame the I picture is reproduced in the GOP, and information regarding the number of pages (number of frames) of the video data contained in each VOBU.

The present invention has been developed in view of the above situation, and is related to a technique that allows a video stream to be reproduced in a simpler process.

Means for Solving the Problems

A recording apparatus of the present invention for dividing a video stream into data segments, each data segment containing at least one frame of video data, and recording data onto a data recording medium on a per data segment basis, includes information generating means for generating additional data, separate from the video stream, containing additional information regarding the relationship between the video data contained in one data segment and the video data contained in another data segment or additional information regarding characteristics of the video data contained in each data segment, multiplexing means for multiplexing the additional data with the data segment at a predetermined position thereof, and recording control means for controlling the recording of the data segment onto the data recording medium.

The additional information includes at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment.

The video stream is a video stream that has been encoded in compliance with MPEG (Moving Picture Experts Group) 2, and the data segment is a VOBU (Video Object Unit).

The additional information includes at least one piece of information equivalent to a closed GOP (Group of Pictures) flag, information equivalent to a broken kink flag, information regarding a reproduction order of I-pictures in the VOBU, the number of frames of video to be reproduced by the VOBU, the number of pages of video data contained in the VOBU, and information equivalent to a progressive frame flag.

A recording method of the present invention of dividing a video stream into data segments, each data segment containing at least one frame of video data, and recording data onto a data recording medium on a per data segment basis, includes an information generating step of generating additional data, separate from the video stream, containing additional information regarding the relationship between the video data contained in one data segment and the video data contained in another data segment or additional information regarding characteristics of the video data contained in each data segment, a multiplexing step of multiplexing the additional data with the data segment at a predetermined position thereof, and a recording control step of controlling the recording of the data segment onto the data recording medium.

A first recording medium of the present invention stores a computer-readable program for a recording apparatus for dividing a video stream into data segments, each data segment containing at least one frame of video data, and recording data onto a data recording medium on a per data segment basis. The program includes an information generating step of generating additional data, separate from the video stream, containing additional information regarding the relationship between the video data contained in one data segment and the video data contained in another data segment or additional information regarding characteristics of the video data contained in each data segment, a multiplexing step of multiplexing the additional data with the data segment at a predetermined position thereof, and a recording control step of controlling the recording of the data segment onto the data recording medium.

A first program of the present invention causes a computer of a recording apparatus to perform a recording process, the recording apparatus dividing a video stream into data segments, each data segment containing at least one frame of video data, and recording data onto a data recording medium on a per data segment basis. The first program includes an information generating step of generating additional data, separate from the video stream, containing additional information regarding the relationship between the video data contained in one data segment and the video data contained in another data segment or additional information regarding characteristics of the video data contained in each data segment, a multiplexing step of multiplexing the additional data with the data segment at a predetermined position thereof, and a recording control step of controlling the recording of the data segment onto the data recording medium.

A reproducing apparatus of the present invention reproduces a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment. The reproducing apparatus includes reading control means for controlling the reading of data from the data recording medium so that the additional data contained in the data segment containing the video data to be reproduced is read from the data recording medium prior to the reading of the video data, and reproduction control means for controlling the reproducing of the video data based on the additional information contained in the read additional data.

The additional information includes decode information indicating whether to use video data contained in another data segment when the video data contained in one data segment is decoded, and the reading control means controls the reading of the other data segment from the data recording medium based on the decode information when the video data contained in the one data segment is to be decoded.

The video stream is a video stream that has been encoded in compliance with MPEG (Moving Picture Experts Group) 2, the data segment is a VOBU (Video Object Unit), and the decode information is information equivalent to a closed-GOP (Group of Pictures) flag or information equivalent to a broken link flag.

The additional information is video data contained in the data segment, and contains reproduction order information regarding a reproduction order of the video data that is to be accessed when the video stream is randomly accessed, and the reproduction control means includes reproduction order control means for controlling the reproduction order of the video data based on the reproduction order information.

The video stream is a video stream that has been encoded in compliance with MPEG (Moving Picture Experts Group) 2, the data segment is a VOBU (Video Object Unit), and the reproduction order information is information regarding the reproduction order of I-pictures in the VOBU.

The additional information includes video data amount information regarding an amount of video data contained in the data segment, and the reproduction control means includes management means for managing the number of frames of video reproduced from the video stream, or the number of pages of video data contained in the video stream based on the video data amount information.

The video stream is a video stream that has been encoded in compliance with MPEG (Moving Picture Experts Group) 2, the data segment is a VOBU (Video Object Unit), and the video data amount information is the number of frames of video reproduced from the VOBU, or the number of pages of video data contained in the VOBU.

The additional information includes scanning method information regarding a scanning method of the video data contained in the data segment, and the reproduction control means includes correction means for correcting an output signal responsive to the video data based on the scanning method information.

The video stream is a video stream that has been encoded in compliance with MPEG (Moving Picture Experts Group) 2, the data segment is a VOBU (Video Object Unit), the scanning method information is information equivalent to a progressive frame flag, and the correction means performs field correction on the output signal based on the information equivalent to the progressive frame flag.

A reproducing method of the present invention reproduces a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment. The reproducing method includes a reading control step of controlling the reading of data from the data recording medium so that the additional data contained in the data segment containing the video data to be reproduced is read from the data recording medium prior to the reading of the video data, and a reproduction control step of controlling the reproducing of the video data based on the additional information contained in the read additional data.

A second recording medium of the present invention stores a computer-readable program for a reproducing apparatus for reproducing a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment. The program includes a reading control step of controlling the reading of data from the data recording medium so that the additional data contained in the data segment containing the video data to be reproduced is read from the data recording medium prior to the reading of the video data, and a reproduction control step of controlling the reproducing of the video data based on the additional information contained in the read additional data.

A second program of the present invention causes a computer of a reproducing apparatus to perform a reproducing process, the reproducing apparatus reproducing a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment. The program includes a reading control step of controlling the reading of data from the data recording medium so that the additional data contained in the data segment containing the video data to be reproduced is read from the data recording medium prior to the reading of the video data, and a reproduction control step of controlling the reproducing of the video data based on the additional information contained in the read additional data.

In the recording apparatus, the recording method, the first recording medium, and the first program of the present invention, the video stream is divided into a plurality of data segments, each data segment containing at least one frame of video data, and is recorded onto the data recording medium on a per data segment basis. The additional data, separate from the video stream, is generated. The additional data contains additional information regarding the relationship between the video data contained in one data segment and the video data contained in another data segment or additional information regarding characteristics of the video data contained in each data segment. The additional data is multiplexed with the data segment at a predetermined position thereof, and the recording of the data segment onto the data recording medium is controlled.

In the reproduction apparatus, the reproducing method, the second recording medium, and the second program of the present invention, the reproduction process is performed on a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment. The reading of data from the data recording medium is controlled so that the additional data contained in the data segment containing the video data to be reproduced is read from the data recording medium prior to the reading of the video data, and the reproducing of the video data is controlled based on the additional information contained in the read additional data.

Advantages

In accordance with the recording apparatus, the recording method, the first recording medium, and the first program of the present invention, the video stream is recorded onto the data recording medium. In accordance with the recording apparatus, the recording method, the first recording medium, and the first program of the present invention, the reproducing apparatus records the video stream onto the data recording medium so that the video stream is reproduced in a simpler operation.

In accordance with the reproducing apparatus, the reproducing method, the second recording medium, and the second program of the present invention, the video stream recorded on the data recording medium is reproduced. In accordance with the reproducing apparatus, the reproducing method, the second recording medium, and the second program of the present invention, the video stream recorded on the data recording medium is reproduced in a simpler operation.

As a result, a specified video can be reliably reproduced. The video is displayed more quickly.

BRIEF DESCRIPTION OF THE DRAWINGS

FIG. 16 is a flowchart illustrating a speed modification process of the reproducing apparatus of FIG. 11.

FIG. 17 is a flowchart illustrating a speed modification process of the reproducing apparatus of FIG. 11.

Figure 1:
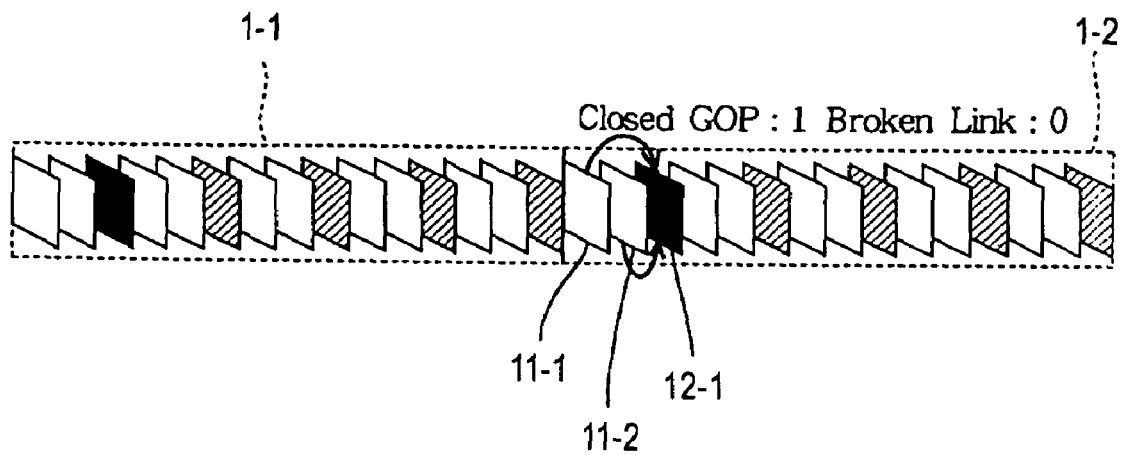
FIG. 1 illustrates a closed GOP flag and a broken link flag of MPEG 2 data.
Figure 2:
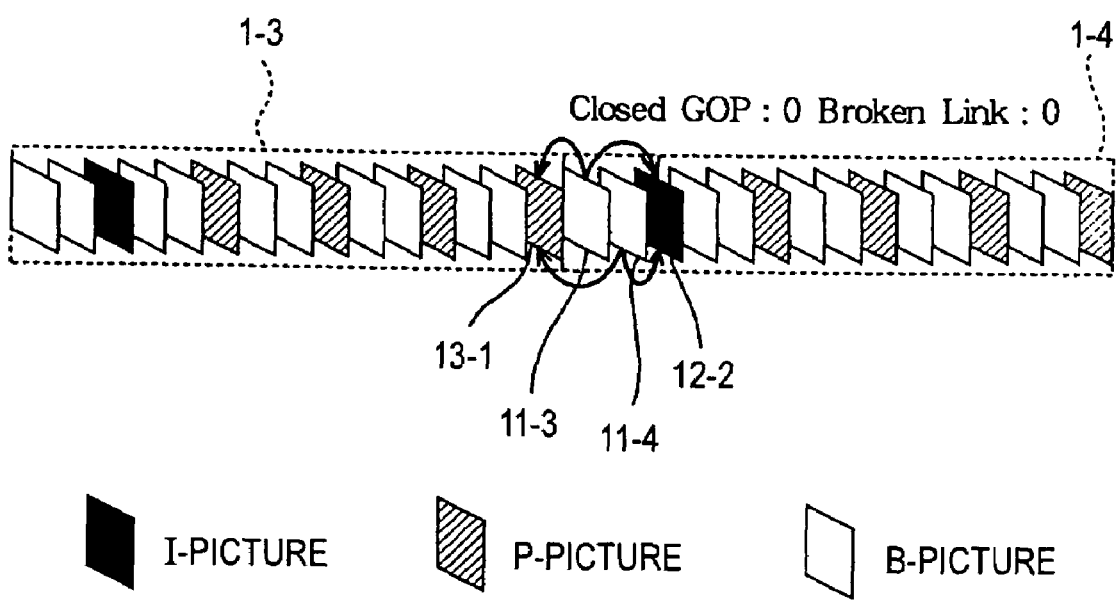
FIG. 2 illustrates a closed GOP flag and a broken link flag of MPEG 2 data.
Figure 3:
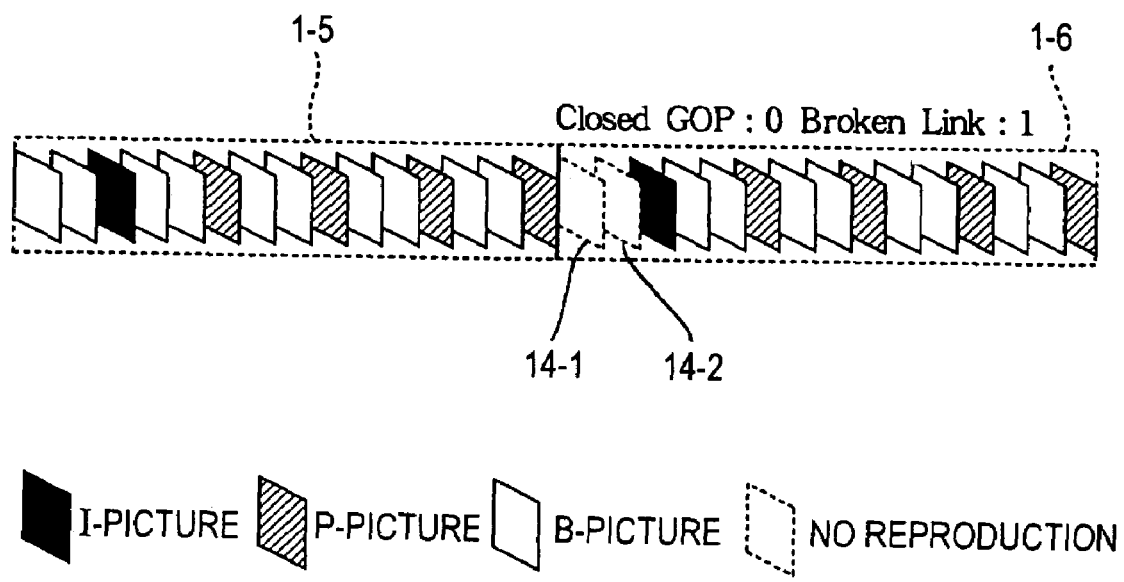
FIG. 3 illustrates a closed GOP flag and a broken link flag of MPEG 2 data.

REFERENCE NUMERALS 101 recording apparatus, 102 recording medium, 111 AV steam generator, 112 stream buffer, 113 medium recorder, 114 recording controller, 141 processor, 142 ROM, 143 RAM, 144 input and output interface, 151 drive, 152 removable medium, 161 data generation controller, 162 information generator, 163 information recorder, 164 data recording controller, 201 reproducing apparatus, 211 medium recorder, 212 stream buffer, 213 demultiplexing and decoding processor, 214 output signal controller, 215 recording controller, 241 processor, 242 ROM, 243 RAM, 244 input and output interface, 251 drive, 252 removable medium, 261 data reproduction controller, 262 data reading controller, 263 information retriever, 271 reproduction position setter, 272 output signal generation controller, 273 output controller, 274 signal corrector, 275 frame counter manager

BEST MODE FOR CARRYING OUT THE INVENTION

The embodiments of the present invention are described below with reference to the drawings.

Figure 4:
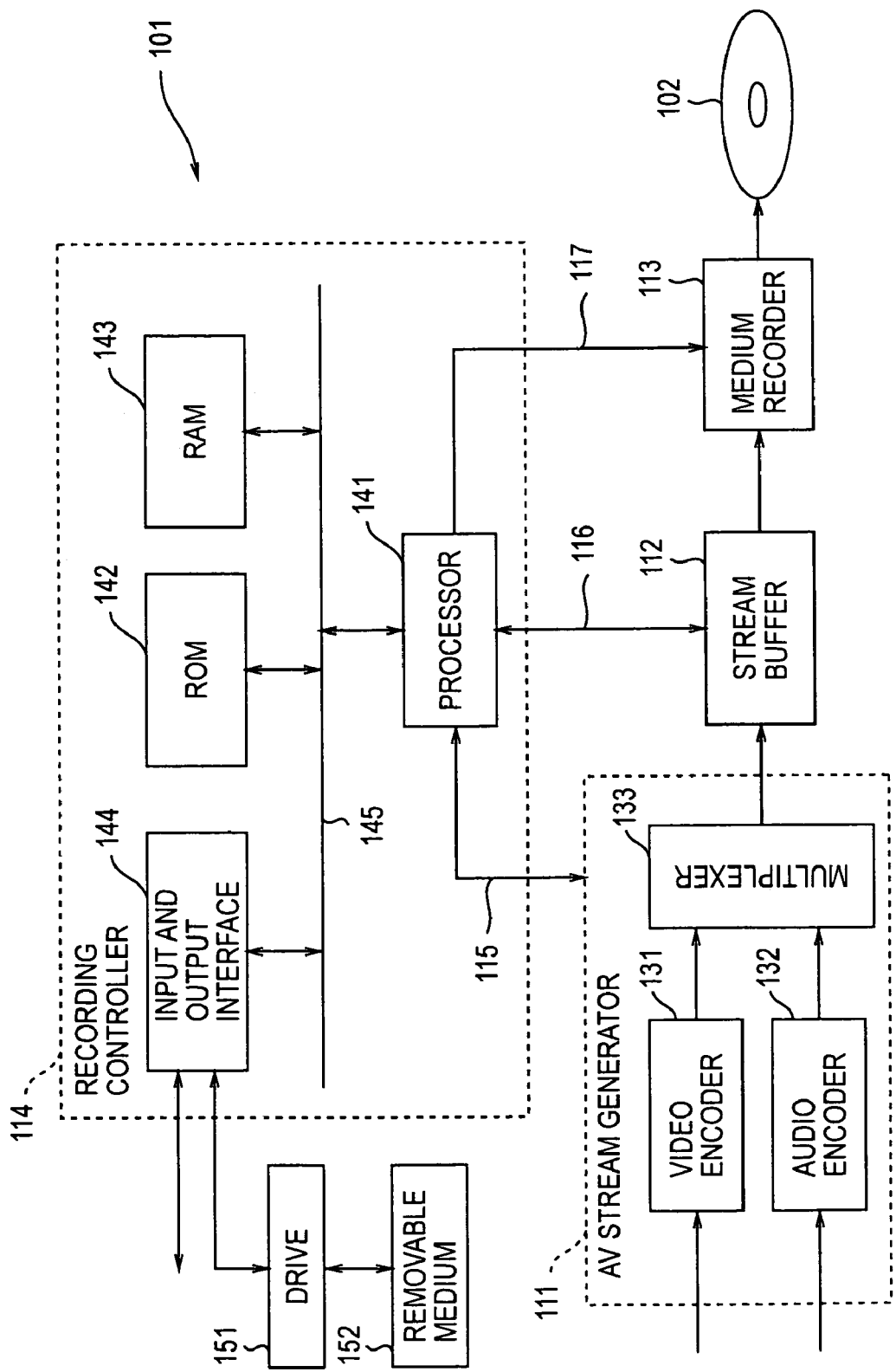
FIG. 4 is a block diagram illustrating a recording apparatus implementing one embodiment of the present invention.

FIG. 4 is a block diagram illustrating a recording apparatus 101 implementing one embodiment of the present invention. The recording apparatus 101 includes an AV steam generator 111, a stream buffer 112, a medium recorder 113, and a recording controller 114. The AV steam generator 111 is connected to the recording controller 114 via a signal line 115, the stream buffer 112 is connected to the recording controller 114 via a signal line 116, and the medium recorder 113 is connected to the recording controller 114 via a signal line 117.

The AV steam generator 111 includes a video encoder 131, an audio encoder 132, and a multiplexer 133.

The video encoder 131 includes a DSP (Digital Signal Processor) or a CPU (Central Processing Unit) executing a video processing program. The video encoder 131, under the control of the recording controller 114, encodes a video signal input from the outside into an MPEG 2 video stream. The video encoder 131 supplies the encoded video stream to the multiplexer 133.

The audio encoder 132 includes a DSP or a CPU executing an audio processing program. The audio encoder 132, under the control of the recording controller 114, encodes an audio signal input from the outside into an audio stream complying with AC3 (Audio Code Number 3) or PCM (Pulse Code Modulation). The audio encoder 132 supplies the encoded audio stream to the multiplexer 133.

The multiplexer 133, under the control of the recording controller 114, generates an AV stream by multiplexing one of the video stream, the audio stream, and sub-picture data, and supplies the generated AV stream to the stream buffer 112.

The stream buffer 112 successively stores the AV stream supplied from the multiplexer 133. More specifically, the stream buffer 112 stores at the head thereof the AV stream previously supplied from the multiplexer 133 (in the past).

A recording medium 102, such as one of a magnetic disk, an optical disk, and a magneto-optical disk, is loaded onto the medium recorder 113. The medium recorder 113, under the control of the recording controller 114, reads the AV stream from the stream buffer 112, and causes the recording medium 102 to store the read AV stream.

By executing a predetermined program, the recording controller 114 controls the AV steam generator 111 and the medium recorder 113 while monitoring the amount of data in the stream buffer 112.

The recording controller 114 includes a processor 141, ROM (Read Only Memory) 142, RAM (Random Access Memory) 143, and an input and output interface 144. The processor 141, the ROM 142, the RAM 143, and the input and output interface 144 are mutually connected to each other via a bus 145.

The processor 141 includes a CPU (Central Processing Unit) or a MPU (Micro Processing Unit), for example.

The processor 141, connected to the AV steam generator 111 via the signal line 115, supplies the video encoder 131 with a signal commanding the video encoder 131 to encode a video signal, supplies the audio encoder 132 with a signal commanding the audio encoder 132 to encode an audio signal, and supplies the multiplexer 133 with a signal commanding the multiplexer 133 to multiplex one of the video stream, the audio stream, and the sub-picture data. The processor 141 retrieves, from the AV steam generator 111, one of the video stream, the audio stream, and information regarding the AV stream generated by the AV steam generator 111.

The processor 141, connected to the stream buffer 112 via the signal line 116, monitors the amount of data in the stream buffer 112, and supplies data to the stream buffer 112 for storage.

The processor 141, connected to the medium recorder 113 via the signal line 117, supplies the medium recorder 113 with a signal commanding the medium recorder 113 to record the AV stream stored on the stream buffer 112 onto the recording medium 102.

The ROM 142, composed of a flash memory, such as EEPROM (Electronically Erasable and Programmable Read Only Memory), stores basically fixed data from among control programs and calculation parameters used by the processor 141.

The RAM 143, composed of one of SRAM (Static Random Access Memory) and DRAM (Dynamic Random Access Memory), stores work data required for the processor 141 to execute the programs.

The input and output interface 144 includes a variety of switches and buttons, a USB (Universal Serial Bus) port, an IEEE 1394 port, a modem, an IEEE802.3 interface, etc. The input and output interface 144 receives data output from and input to an external device connected thereto, and a device connected to an external network, and operational inputs entered by a user.

The input and output interface 144 connects to a drive 151, as necessary. A removable medium 152 is loaded onto the drive 151. Loaded onto the drive 151 is the removable medium 152, including one of a magnetic disk (flexible disk), an optical disk (CD-ROM (Compact Disc-Read Only Memory), a DVD (Digital Versatile Disc), a magneto-optical disc (MD (Mini-Disc) (registered trademark)), and a semiconductor memory. The drive 151 reads data and program from the removable medium 152 and writes data and program onto the removable medium 152. A program read from the removable medium 152 may be stored onto one of the ROM 142 and the RAM 143 for installation, as necessary.

Figure 5:
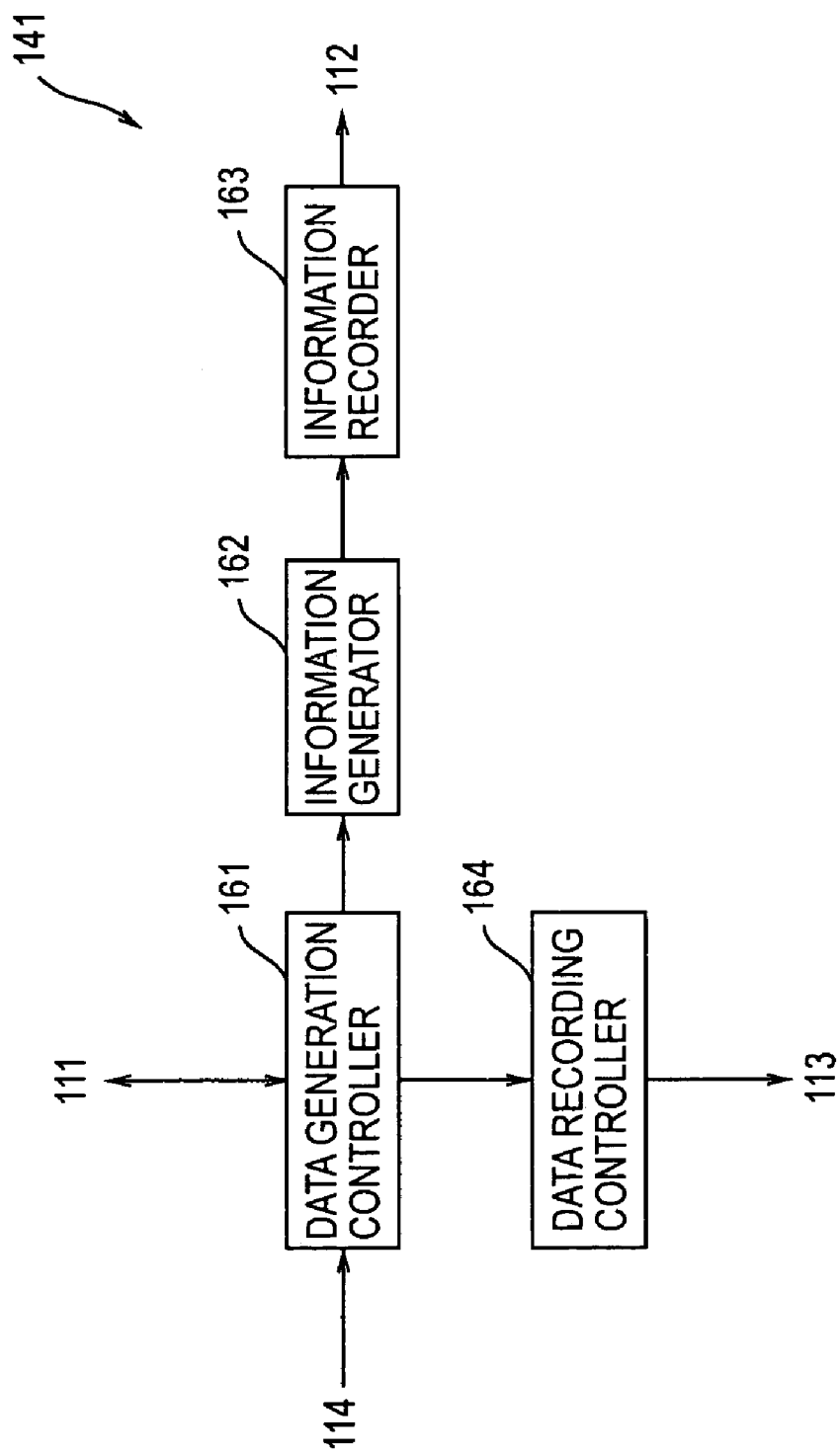
FIG. 5 is a functional block diagram embodied by a processor of FIG. 4 executing a control program.

FIG. 5 is a block diagram illustrating a functional structure embodied by the processor 141 executing a control program. With the processor 141 executing the control program, a data generation controller 161, an information generator 162, an information recorder 163, and a data recording controller 164 are implemented.

Upon receiving an operational input signal entered via the input and output interface 144 by the user, the data generation controller 161 supplies the operational input signal to one of the information generator 162 and the data recording controller 164. The data generation controller 161 controls the AV steam generator 111, thereby causing the AV steam generator 111 to encode one of the video signal and the audio signal, input from the outside, and multiplex one of the video stream, the audio stream, and the sub-picture data to generate the AV stream. The data generation controller 161 controls the AV steam generator 111 to cause the stream buffer 112 to store the AV stream. The data generation controller 161 retrieves one of the video stream, the audio stream, and the AV stream from the AV steam generator 111, and supplies the information generator 162 with the retrieved data.

Figure 10:
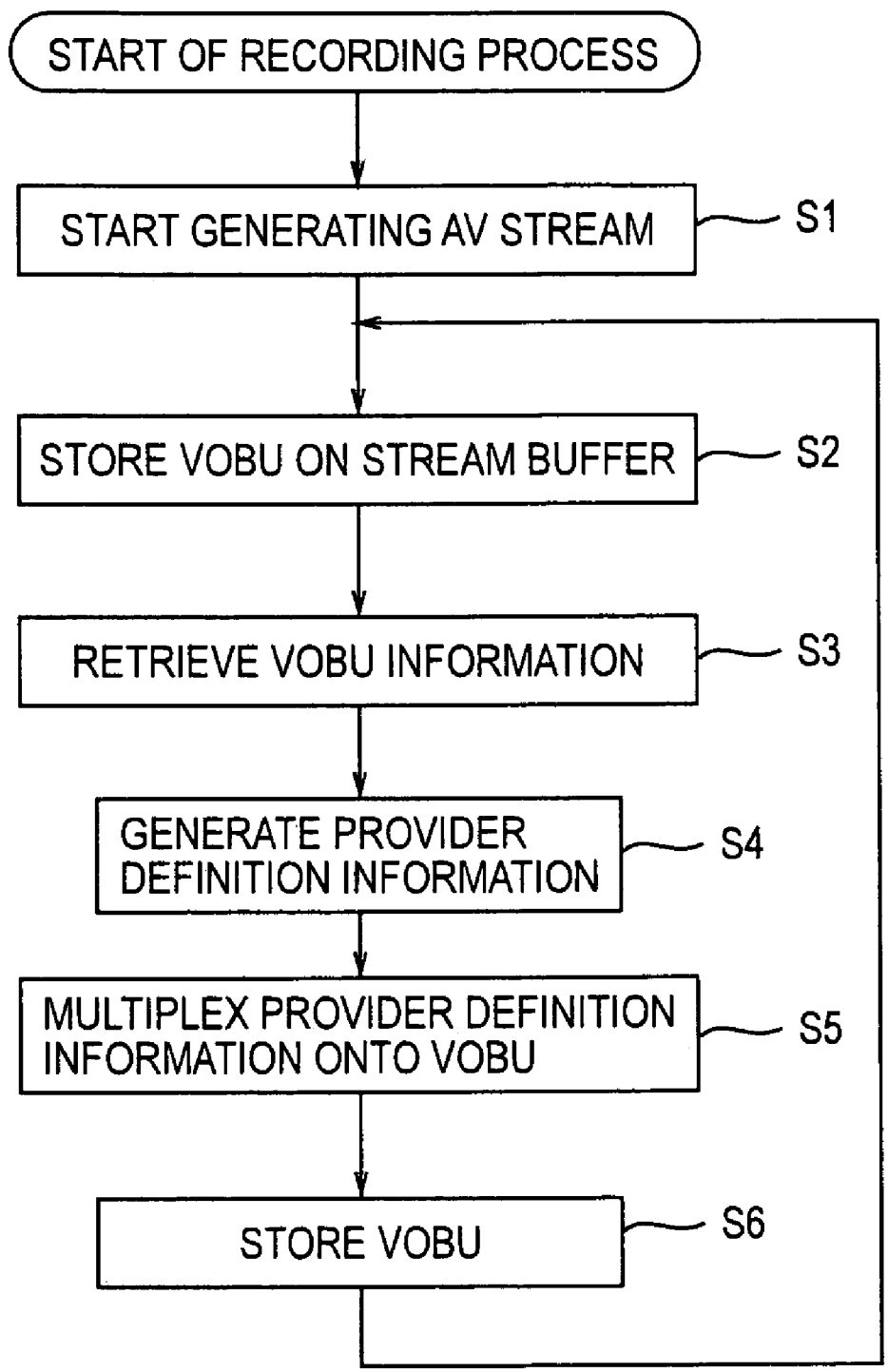
FIG. 10 is a flowchart illustrating a recording process of the recording apparatus of FIG. 4.

As will be described later with reference to FIG. 10, the information generator 162 generates provider definition information regarding the AV stream to be recorded onto the recording medium 102, based on the video stream, the audio stream, and the AV stream retrieved from the data generation controller 161. The information generator 162 supplies the information recorder 163 with the generated provider definition information.

The information recorder 163 multiplexes the provider definition information with the AV stream stored on the stream buffer 112.

The data recording controller 164 controls the medium recorder 113, thereby causing the AV stream stored on the stream buffer 112 to be stored on the recording medium 102.

Figure 6:
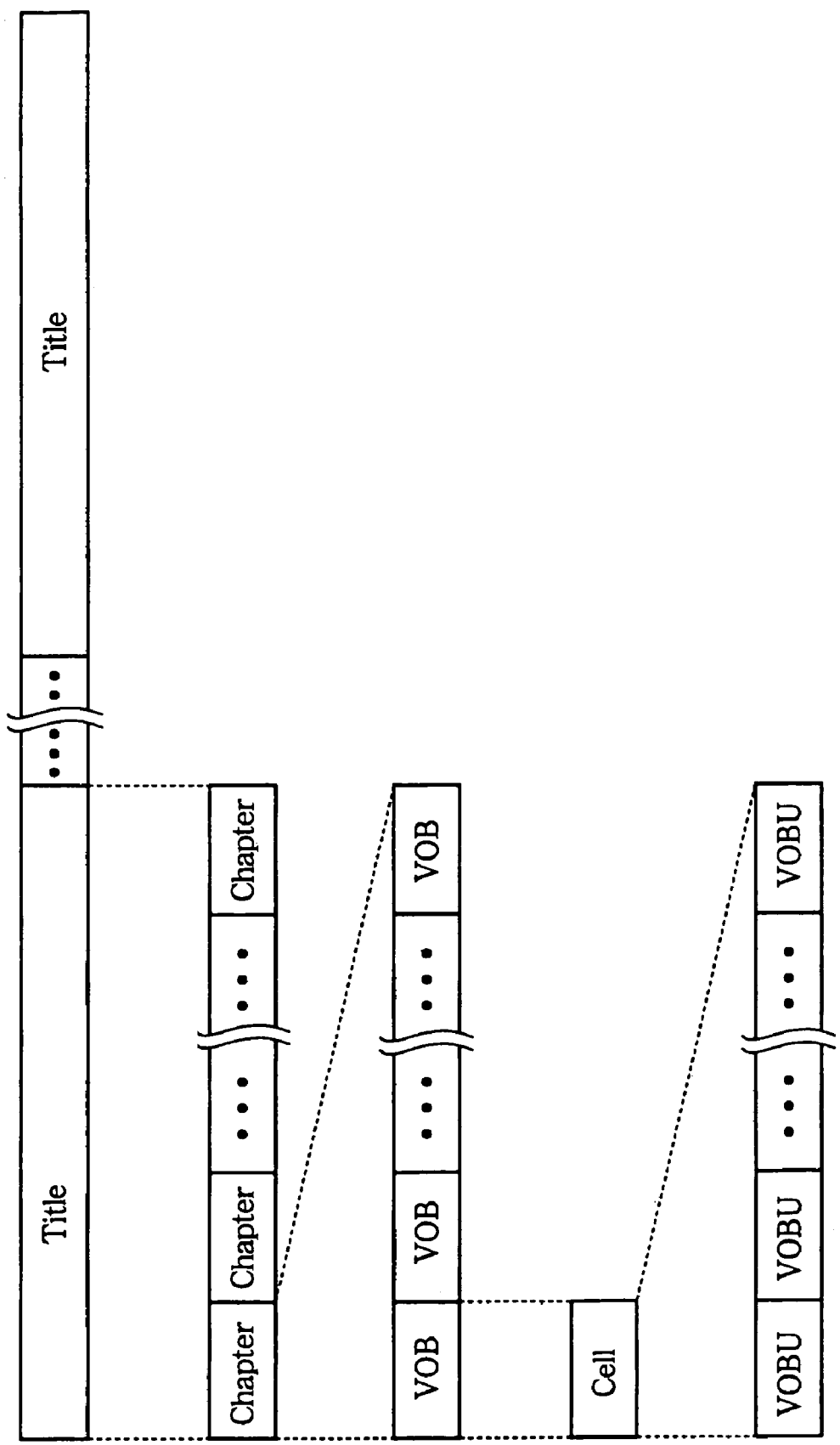
FIG. 6 illustrates a data structure of an AV stream recorded in accordance with DVD-Video format.

FIG. 6 illustrates a data structure of the AV stream that has been stored onto the recording medium 102 in accordance with the standard of the DVD-Video format.

The AV stream is stored onto the recording medium 102 on a per recording unit with a title being one recording unit. At least one title of AV stream is stored on the recording medium 102. One title herein corresponds to an AV stream of one movie. The title is composed of at least one chapter. One chapter is composed of at least one VOB (Video Object). The VOB contains a one cell. The VOB may contain a plurality of cells.

One cell contains a plurality of VOBUs (Video Object Units). The recording of data to the recording medium 102 and the reading of data from the recording medium 102 are performed on a per VOBU basis. The VOBU contains a video stream of 1 GOP, and an audio stream or sub-picture data corresponding to the video stream. The VOBU may contain a video stream of a plurality of GOPs, and an audio stream or sub-picture data corresponding to the video stream.

Figure 7:
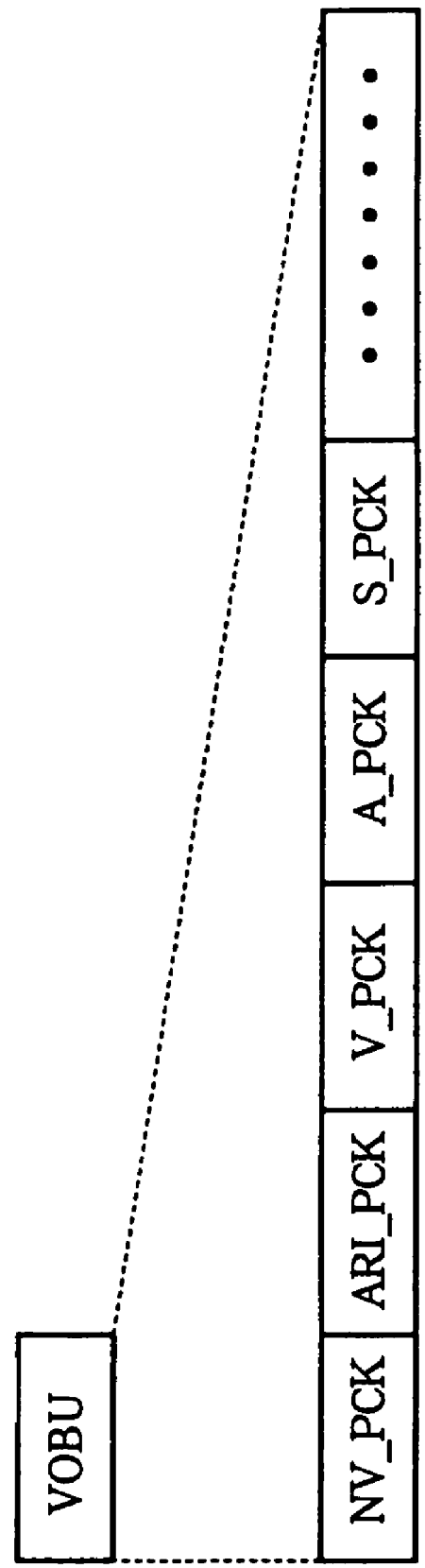
FIG. 7 illustrates a data structure of VOBU of the AV stream recorded in accordance with the DVD-Video format.

FIG. 7 illustrates a data structure of the VOBU. Data, such as the video stream or the audio stream, is packetized. A plurality of packets are united into a pack (PCK) with header information attached thereto. The pack, having a predetermined data size (2048 bytes, for example), is recorded onto the recording medium 102.

Navigation information (NV_PCK) is arranged at the head of a VOBU. The navigation information contains data search information (DSI), and presentation control information (PCI). The DSI contains control information related to data accessing, such as a recording position of a first frame of the video stream contained in the VOBU on the recording medium 102, and a recording position of an I picture contained in the VOBU on the recording medium 102. The PCI contains control information related to reproduction and displaying, such as an aspect ratio and an angle of a screen.

The provider definition information (ARI_PCK), which is a pack of additional information related to data and contained in the VOBU, is placed at a predetermined position behind the navigation information (NV_PCK). The provider definition information contains information related to a relationship between the video data contained in one VOBU and the video data contained in another VOBU, and characteristics of the video data contained in the VOBU. The provider definition information is a pack separate from a video pack (V_PCK), into which data of the video stream is packed. The video data contained in V_PCK, namely, information of the video data contained in the VOBU, is retrieved by referencing the provider definition information (ARI_PCK) without the need for decoding V_PCK. The provider definition information (ARI_PCK) will be described later together with a recording process of the recording apparatus 101 with reference to FIG. 10.

Multiplexed and placed in succession to the provider definition information (ARI_PCK) are a video pack (V_PCK), an audio pack (A_PCK), into which data of the audio stream corresponding to the video stream is packed, and a sub-picture pack (S_PCK), into which the sub-picture data corresponding to the video stream is packed.

The location of the provider definition information is not limited to the position immediately subsequent to the navigation information. The provider definition information may be placed at any recording position from which the provider definition information (ARI_PCK) is learned and retrieved before the video stream (V_PCK) of the VOBU is read from the recording medium 102 and decoded. For example, the provider definition information (ARI_PCK) may be placed at a predetermined location behind the front end of the VOBU. Alternatively, the recording position of the provider definition information (ARI_PCK) in the VOBU may be recorded in the navigation information, and the provider definition information may be located in that recording position.

Figure 8:
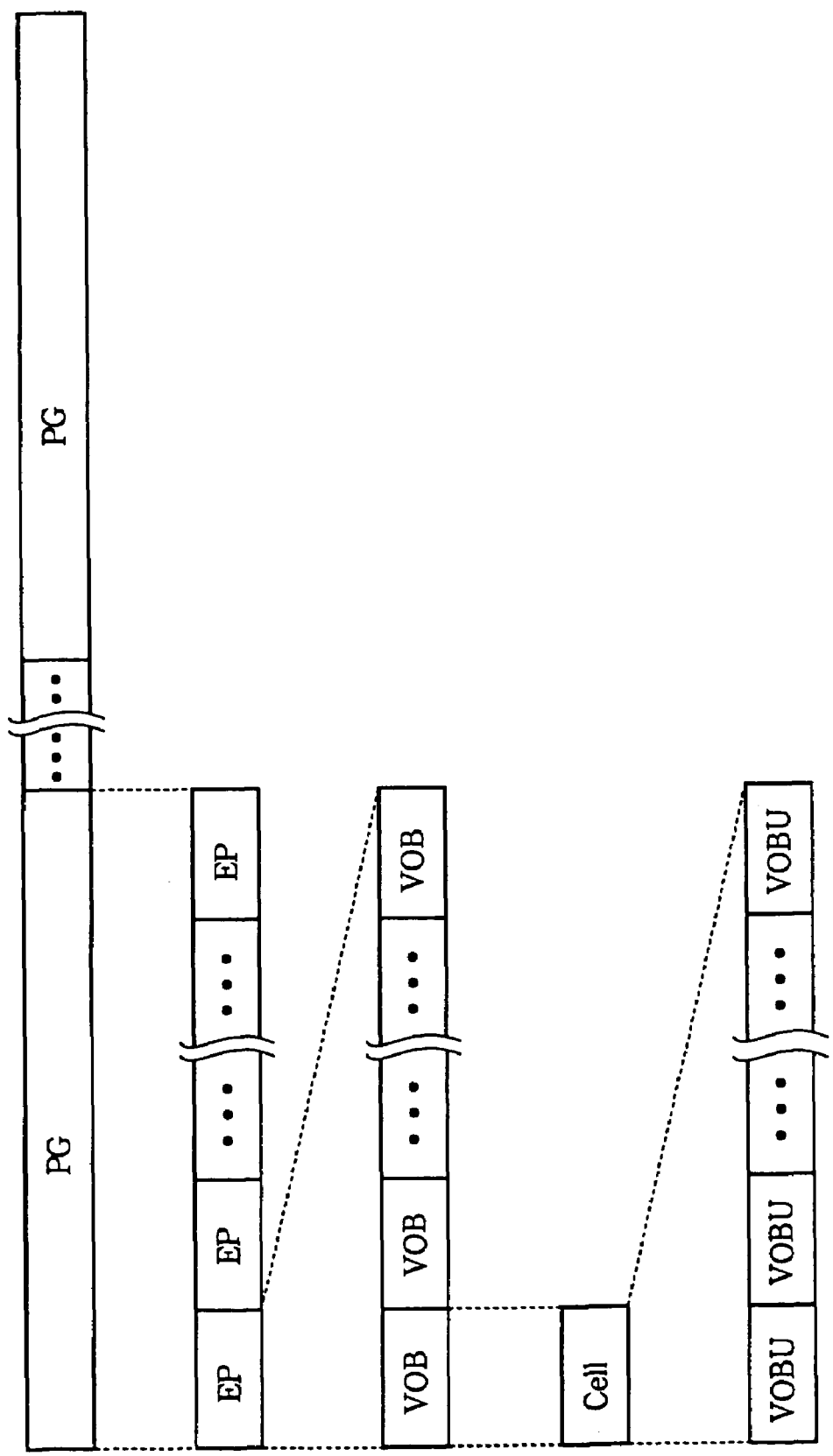
FIG. 8 illustrates a data structure of the AV stream recorded in accordance with the DVD-VR format.

FIG. 8 illustrates a data structure of the AV stream that is recorded onto the recording medium 102 in accordance with the DVD-VR (Video Recording) format standard.

The AV stream is recorded onto the recording medium 102 with a PG (program) as a recording unit. For example, one PG corresponds to an AV stream recorded by a single recording process. The PG is composed of at least one EP (entry point). The EP is arbitrarily set in the PG using an authoring tool. The EP contains at least one VOBU. The data structure hierarchically lower than the VOBU is identical to the DVD-Video format described with reference to FIG. 6, and the discussion thereof is not repeated herein.

Figure 9:
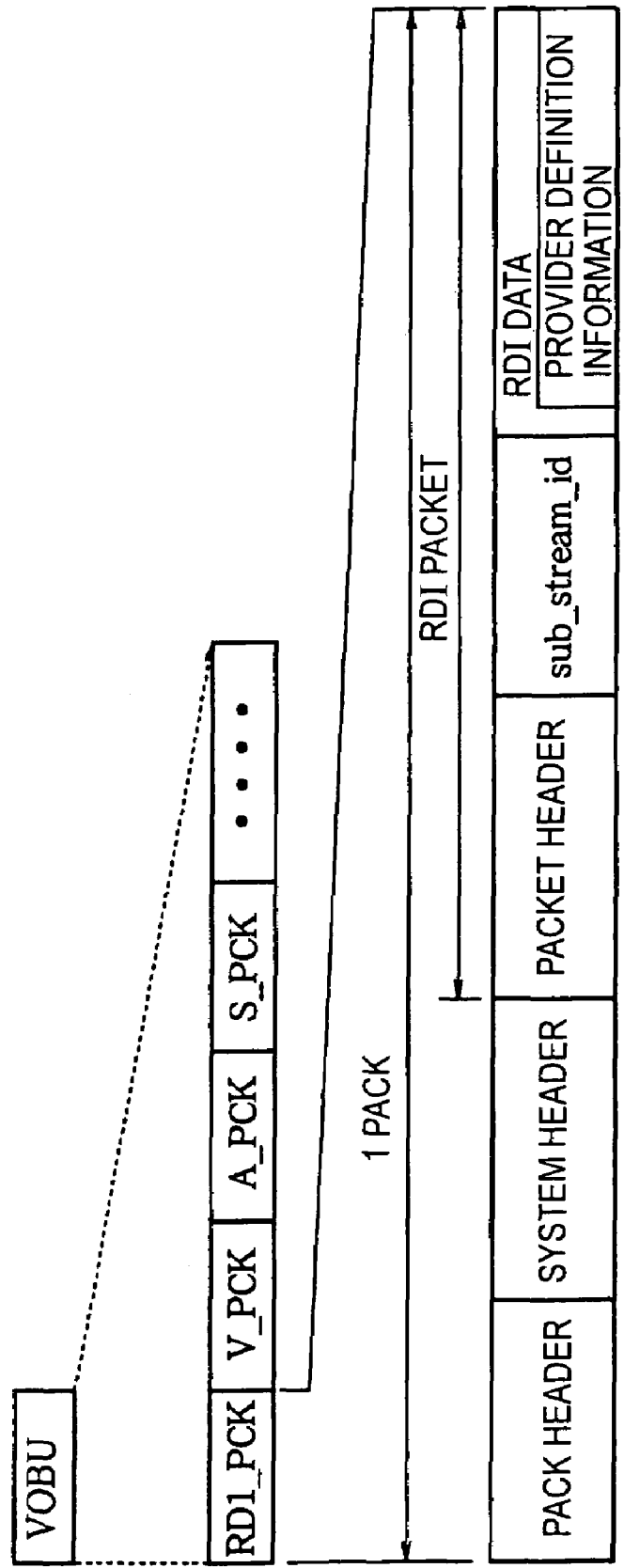
FIG. 9 illustrates a data structure of the VOBU of the AV stream recorded in accordance with the DVD-VR format.

FIG. 9 illustrates a data structure of the VOBU in the DVD-VR format.

RDI (Real time Data Information)_PCK is arranged at the front end of the VOBU. Two units of header information, namely, a pack header and a system header, are arranged at the front end of the RDI_PCK, followed by an RDI (Real time Data Information) packet. A packet header and sub_stream_id are arranged at the front end of the RDI packet. RDI (Real time Data Information) data as real data of the RDI packet is arranged at a predetermined position subsequent to sub_stream_id. The provider definition information identical in structure to the DVD-Video format of FIG. 7 is recorded on a recording area of the RDI data.

As in the VOBU in the DVD-Video format of FIG. 7, V_PCK, A_PCK, and S_PCK are multiplexed and recorded in succession to RDI_PCK.

The provider definition information can be retrieved by reading the RDI data without the need for decoding V_PCK. The video data contained in V_PCK, namely, the video data contained in the VOBU is thus retrieved.

It is assumed in the following discussion that one GOP (VOBU) contains one picture. To access randomly the GOP contained in the video stream of the AV stream, the reproducing apparatus for reproducing the AV stream recorded on the recording medium 102 accesses the I picture in the GOP. For example, to access any GOP for reproduction regardless of a predetermined reproduction order or to reproduce the video data contained in the video stream in a fast forward reproduction, the reproducing apparatus accesses the I picture in the GOP for reproduction.

The recording process executed by the recording apparatus 101 is described below with reference to a flowchart of FIG. 10. This process is initiated when a user enters a start command of the recording process by operating the input and output interface 144 and a command signal to start the recording process is issued from the recording controller 114 to the data generation controller 161 via the bus 145. The inputting of the video signal from an external video apparatus to the video encoder 131 and the inputting of the audio signal from an external audio apparatus to the audio encoder 132 are started in response to the start of the recording process.

In step S1, the AV steam generator 111 starts generating the AV stream under the control of the data generation controller 161. More specifically, the video encoder 131 under the control of the data generation controller 161 generates the video stream by encoding the video signal input from the outside, and supplies the multiplexer 133 with the generated video stream. The audio encoder 132 under the control of the data generation controller 161 generates the audio stream by encoding the audio signal input from the outside, and supplies the multiplexer 133 with the generated audio stream. The multiplexer 133 multiplexes the video stream, the audio stream, and the sub-picture data supplied from the processor 141 as necessary to generate the AV stream.

In step with the generation of the AV stream, the AV steam generator 111 generates information related to the VOBU of the generated AV stream (hereinafter referred to as VOBU information). The VOBU information contains information equivalent to the closed GOP flag of the GOP contained in the VOBU (hereinafter referred to as closed GOP information), information equivalent to the broken link flag (hereinafter referred to as broken link information), information indicating the reproduction order of the I picture in the VOBU (GOP) (hereinafter referred to as I picture reproduction order information), the number of pages of vide data (pictures) contained in the VOBU (GOP) (hereinafter referred to as the number of real frames), the number of frames of video to be reproduced from VOBU (GOP) (hereinafter referred to as the number of reproduction frames), and information equivalent to the progressive frame flag of each video data (picture) (hereinafter referred to as progressive frame information).

The closed GOP information, the broken link information, and the progressive frame information are respectively identical to the closed GOP flag, the broken link flag, and the progressive frame flag, and may take the same values as the closed GOP flag, the broken link flag, and the progressive frame flag. Alternatively, the closed GOP information, the broken link information, and the progressive frame information may take different values that are respectively obtained by converting the original flag values in accordance with a predetermined rule. If one of the closed GOP flag and the broken link flag is "0", the value of the one of the closed GOP information and the broken link information is set to be off. If one of the closed GOP flag and the broken link flag is "1", the value of the one of the closed GOP information and the broken link information is set to be on. If the value of the broken link flag is off, the value of the progressive frame information is set to be off. If the value of the broken link flag is on, the value of the progressive frame information is set to be on.

When the video data of the VOBU is decoded, the closed GOP information and the broken link information indicate whether the video data of the immediately prior VOBU needs to be used, in other words, are information related to the relationship between the video data contained in one VOBU and the video data contained in another VOBU.

The I picture reproduction order information indicates what frame the I picture within the VOBU (GOP) is reproduced at.

The number of reproduction frames and the number of real frames indicate the amount of video data contained in the VOBU. For example, if the GOP in the VOBU contains video data of six frames, the video data of a sixth frame is repeated for ten frames, and video data of a total of fifteen frames is reproduced. In this case, the number of real frames is six, and the number of reproduction frames is fifteen.

The I picture reproduction order information, the number of reproduction frames, and the number of real frames, and the progressive frame information indicate characteristics of the video data of the VOBU.

The AV stream of one VOBU is now reproduced in step S2, the multiplexer 133 under the control of the data generation controller 161 causes the stream buffer 112 to store the generated VOBU. An area is reserved beforehand in a predetermined location in the recording region of the VOBU stored on the stream buffer 112 to allow the provider definition information (ARI_PCK) to be additionally stored therewithin later.

In step S3, the data generation controller 161 retrieves the VOBU information of the VOBU stored on the stream buffer 112 from the AV steam generator 111 via the signal line 115. The data generation controller 161 supplies the retrieved VOBU information to the information generator 162.

In step S4, the information generator 162 generates the provider definition information (ARI_PCK) as a pack having a predetermined data size by adding the header information to the VOBU information. The information generator 162 supplies the provider definition information to the information recorder 163.

In step S5, the information recorder 163 multiplexes the provider definition information with the VOBU recorded on the stream buffer 112. More specifically, the information recorder 163 supplies the provider definition information to the stream buffer 112 via the signal line 116, and stores the provider definition information at the recording area reserved in the VOBU stored in the stream buffer 112 at step S2.

In step S6, the medium recorder 113 under the control of the data recording controller 164 stores the VOBU stored on the stream buffer 112 onto the recording medium 102.

Processing returns to step S2 to repeat steps S2 through S6 until the user enters a stop command to stop the recording process by operating the input and output interface 144.

In step S6, all VOBUs may be stored onto the recording medium 102 at a time after VOBUs stored on the stream buffer 112 reach a predetermined amount.

When the AV stream is recorded on the recording medium 102 on a per VOBU, the provider definition information related to the VOBU is multiplexed with each VOBU.

Figure 11:
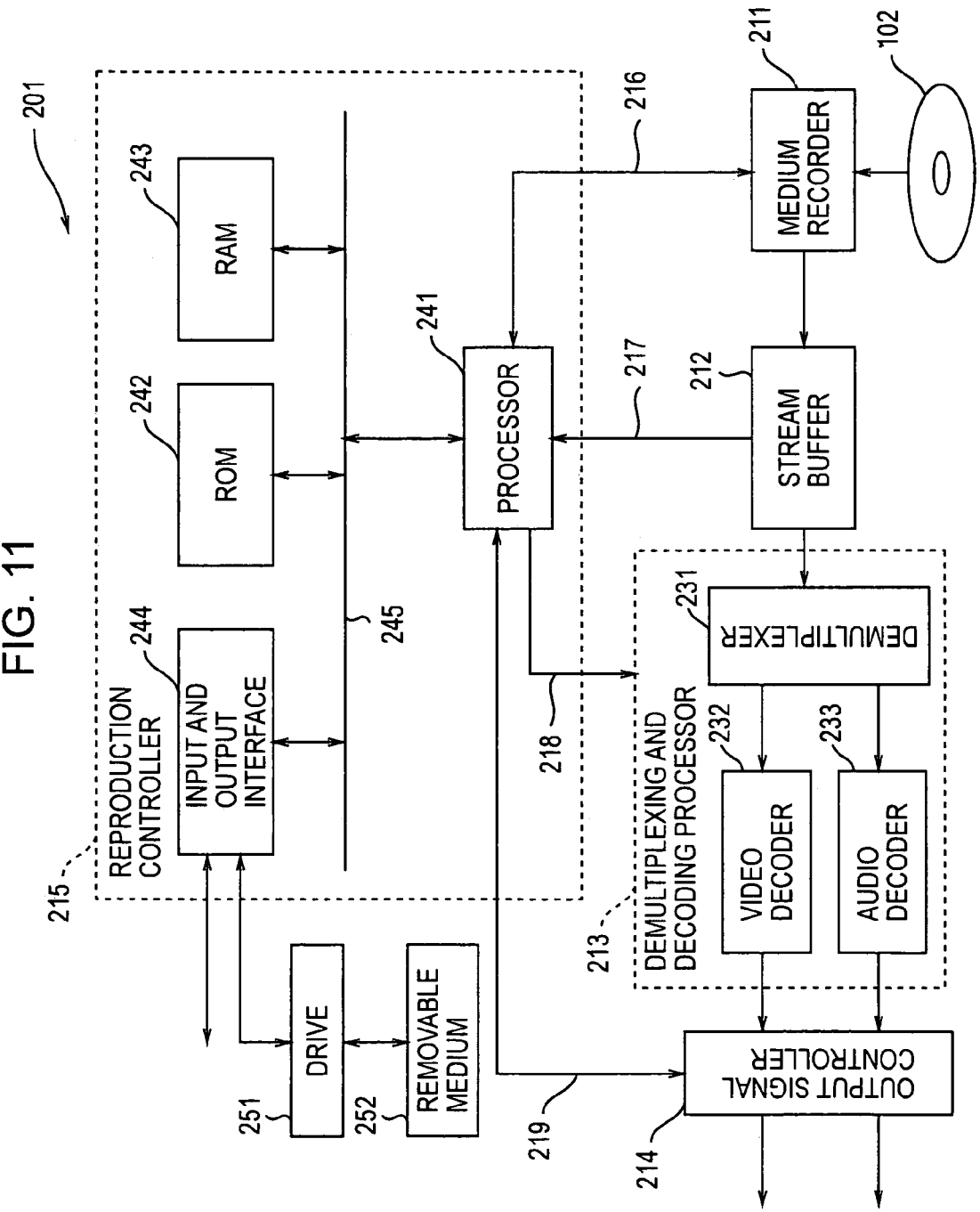
FIG. 11 is a block diagram of a reproducing apparatus implementing one embodiment of the present invention.

FIG. 11 is a block diagram of a reproducing apparatus 201 in accordance with one embodiment of the present invention. The reproducing apparatus 201 includes a medium recorder 211, a stream buffer 212, a demultiplexing and decoding processor 213, an output signal controller 214, and a reproduction controller 215. The medium recorder 211 is connected to the recording controller 215 via a signal line 216, the stream buffer 212 is connected to the reproduction controller 215 via a signal line 217, and the demultiplexing and decoding processor 213 is connected to the reproduction controller 215 via a signal line 218, and the output signal controller 214 is connected to the reproduction controller 215 via a signal line 219.

A recording medium 102 having the AV stream recorded thereon by the recording apparatus 101 is loaded onto the medium recorder 211. The medium recorder 211 under the control of the reproduction controller 215 reads the AV stream from the recording medium 102 and supplies the stream buffer 212 with the read AV stream.

The stream buffer 212 successively stores the AV streams supplied from the medium recorder 211. The stream buffer 212 stores at the front end thereof the AV stream supplied first from the medium recorder 211 (in the past).

The demultiplexing and decoding processor 213 includes a demultiplexer 231, a video decoder 232, and an audio decoder 233.

The demultiplexer 231 under the control of the reproduction controller 215 reads the AV stream from the stream buffer 212, demultiplexes the read AV stream, supplies the video decoder 232 with the demultiplexed video stream, and supplies the audio decoder 233 with demultiplexed audio stream.

The video decoder 232 includes a DSP or a CPU executing a video processing program. The video decoder 232 under the control of the reproduction controller 215 decodes the video stream supplied from the demultiplexer 231, and supplies the decoded video signal to the output signal controller 214.

The audio decoder 233 includes a DSP or a CPU executing an audio processing program. The audio decoder 233 under the control of the reproduction controller 215 decodes the audio stream supplied from the demultiplexer 231, and supplies the decoded audio signal to the output signal controller 214.

The output signal controller 214 under the control of the reproduction controller 215 controls the outputting of the video signal and the audio signal to an external apparatus. The output signal controller 214 under the control of the reproduction controller 215 perform correction processes including a field interpolation process on one of the output video signal and the output audio signal. The output signal controller 214 manages a counter indicating a total number of frames of externally output (displayed) video (hereinafter referred to as an output frame counter).

By executing a predetermined program, the reproduction controller 215 controls the medium recorder 211, the demultiplexing and decoding processor 213 and the output signal controller 214 while monitoring the amount of data in the stream buffer 212. The reproduction controller 215 reads navigation information and provider definition information from of the AV stream read from the recording medium 102 and stored on the stream buffer 212.

When the recording medium 102 is loaded on the medium recorder 211, the reproduction controller 215 controls the medium recorder 211 to read a management information (IFO) file containing management information from the recording medium 102, and retrieves the management information from the medium recorder 211 via the signal line 216. The management information contains information regarding a data structure of the AV stream recorded on the recording medium 102, reproduction time of the AV stream, and recording position of the AV stream on the recording medium 102.

During the reproduction process, the reproduction controller 215 assigns, to the video data, a counter of a serial number starting with 0 in the order of reproduction. More specifically, the reproduction frame counter manages the number of frames of video reproduced (displayed) from the AV stream in one reproduction process. The reproduction controller 215 manages the count of the reproduction frame counter of the video data contained in each reproduced VOBU.

The reproduction controller 215 manages a counter for counting the pages of video data contained in the VOBU read from the recording medium 102 for reproduction (hereinafter referred to as read frame counter). The count of the read frame counter equals the count of the process frame counter in the previously described process frame counter.

The reproduction controller 215 includes a processor 241, a ROM (Read Only Memory) 242, a RAM (Random Access Memory) 243, and an input and output interface 244. The processor 241, the ROM 242, the RAM 243, and the input and output interface 244 are interconnected to each other via a bus 245.

The processor 241 includes a CPU or an MPU.

The processor 241, connected to the medium recorder 211 via the signal line 216, supplies a command signal to read the AV stream stored on the recording medium 102. The processor 241 retrieves a management information file read from the recording medium 102 by the medium recorder 211, and causes the RAM 243 to store the read management information file.

The processor 241, connected to the stream buffer 212 via the signal line 217, reads the navigation information and the provider definition information from the VOBU of the AV stream stored in the stream buffer 212, as necessary, and causes the RAM 243 to store the navigation information and the provider definition information.

The processor 241, connected to the demultiplexing and decoding processor 213 via the signal line 218, supplies the demultiplexer 231 with a command signal to demultiplex the AV stream, supplies the video decoder 232 with a command signal to decode the video stream, and supplies the audio decoder 233 with a command signal to decode the audio stream.

The processor 241, connected to the output signal controller 214 via the signal line 219, supplies the output signal controller 214 with a signal controlling the outputs of the video signal and the audio signal, and a command signal requesting a correction process on one of the video signal and the audio signal.

The processor 241 manages the reproduction frame counter and the read frame counter.

The ROM 242, composed of an EEPROM such as a flash memory, for example, stores basically fixed data from among a program and computation parameters used by the processor 241.

The RAM 243, composed of an SRAM or DRAM, for example, stores work data required to execute the program of the processor 241.

The input and output interface 244 includes a variety of switches, buttons, a USB port, an IEEE 1394 port, a modem, an IEEE802.3 interface, etc. The input and output interface 244 receives data output from and input to an external device connected thereto, and a device connected to an external network, and operational inputs entered by a user.

The input and output interface 244 connects to a drive 251, as necessary. A removable medium 252 is loaded onto the drive 251. The drive 251 includes one of a magnetic disk (including flexible disk), optical disks (including a CD-ROM and a DVD, a magneto-optical disc (MD (Mini-Disc) (registered trademark)), and a semiconductor memory. The drive 251 reads data and program from the removable medium 252 and writes data and program onto the removable medium 252. A program read from the removable medium 252 may be stored onto one of the ROM 242 and the RAM 243 for installation, as necessary.

Figure 12:
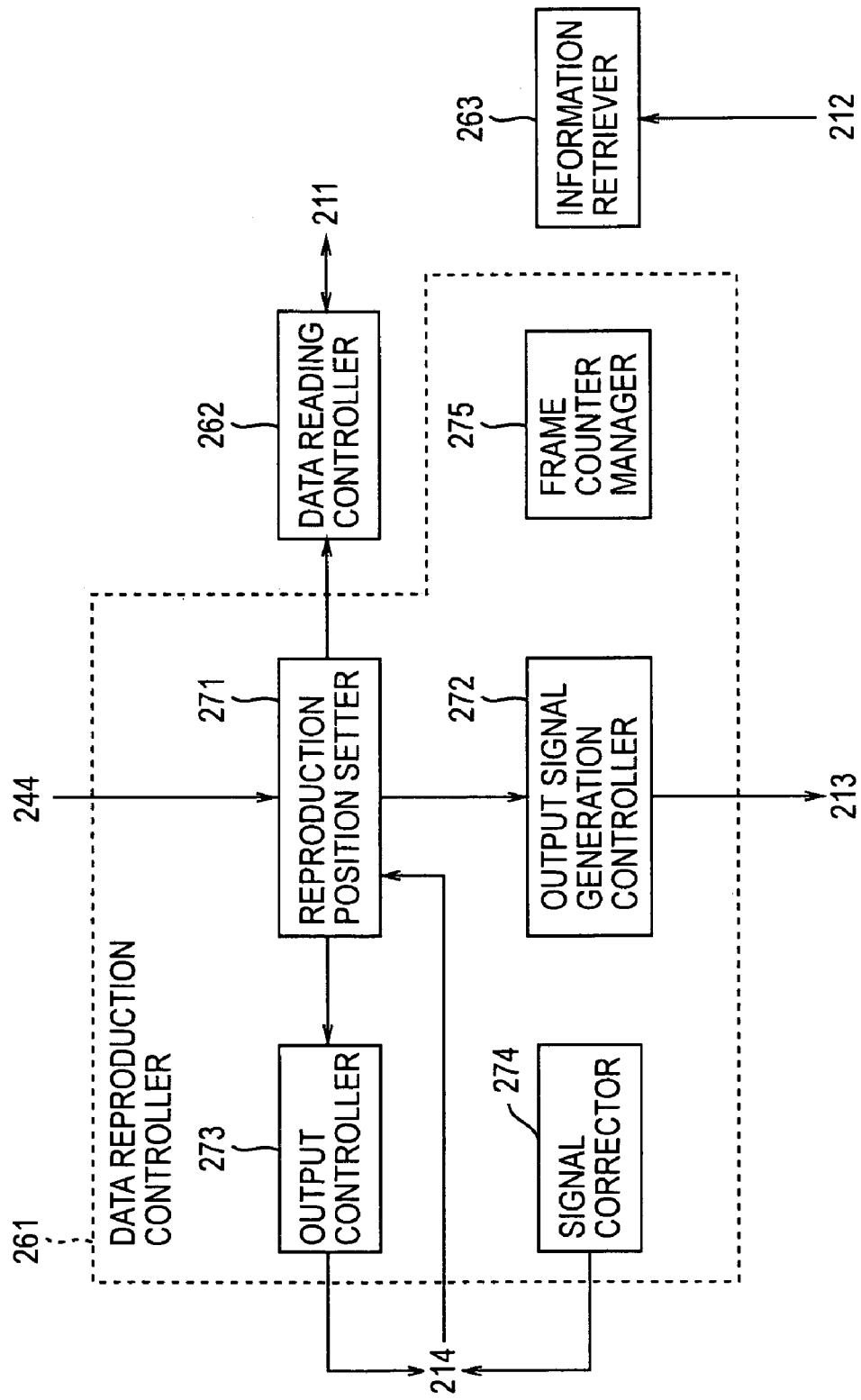
FIG. 12 is a functional block diagram embodied by a processor of FIG. 11 executing a control program.

FIG. 12 is a block diagram illustrating a functional structure implemented by the processor 241 executing a control program. With the processor 241 executing the control program, a data reproduction controller 261, a data reading controller 262 and an information retriever 263 are implemented.

The data reproduction controller 261 controls the demultiplexing and decoding processor 213 and the output signal controller 214, thereby reproducing the AV stream recorded on the recording medium 102. The data reproduction controller 261 includes a reproduction position setter 271, an output signal generation controller 272, an output controller 273, a signal corrector 274, and a frame counter manager 275.

Upon receiving an operational input entered by the user from the input and output interface 244, the reproduction position setter 271 determines reproduction start time of the AV stream recorded on the recording medium 102. Based on the management information, the reproduction position setter 271 converts the reproduction start time into a recording position on the recording medium 102, and supplies the data reading controller 262 with information related to the determined recording position (hereinafter referred to as recording position information). Based on the management information, the reproduction position setter 271 determines, on the recording medium 102, a recording position of the VOBU to be reproduced next in succession to the currently reproduced VOBU. The determined recording position information is then supplied to the data reading controller 262.

The reproduction position setter 271 receives a command signal requesting a modification in a reproduction speed input on the input and output interface 244 by the user (hereinafter referred to as reproduction speed modification signal), and then supplies the reproduction speed modification signal to the output signal generation controller 272 and the output controller 273. In accordance with a reproduction speed responsive to the reproduction speed modification signal, the reproduction position setter 271 selects between the all-frame reproduction method of reproducing all video data (frames) contained in the GOP and the I picture reproduction method of successively reproducing the I pictures only contained in the GOP. In response to a signal representing the operational input entered by the user and the reproduction speed modification signal, the reproduction position setter 271 determines the reproduction speed of the video data, and specifies the recording position information of the video data to be reproduced next in the reproduction order. In this way, the reproduction position setter 271 controls the reproduction order of the video data.

The reproduction position setter 271 retrieves information indicating the count of the output frame counter from the output signal controller 214 via the signal line 219.

The output signal generation controller 272 controls the demultiplexing and decoding processor 213, thereby causing the demultiplexing and decoding processor 213 to demultiplex the AV stream stored on the stream buffer 212, to decode the demultiplexed video stream, and to decode the demultiplexed audio stream. The output signal generation controller 272 controls the demultiplexing and decoding processor 213, thereby causing the demultiplexing and decoding processor 213 to supply the decoded video signal and the decoded audio signal to the output signal controller 214. The output signal generation controller 272 thus controls the demultiplexing and decoding processor 213 so that the AV stream is demultiplexed, so that the video stream and the audio stream are decoded, and so that the periods of the supplying of the video signal and the audio signal becomes a period based on the reproduction speed specified by the reproduction speed modification signal.

The output controller 273 controls the output signal controller 214 in the outputting of one of the video signal and the audio signal. More specifically, the output controller 273 controls the output signal controller 214 so that a frame switching period of the video signal and the audio signal output from the output signal controller 214 becomes a period based on the reproduction speed specified by the reproduction speed modification signal.

The signal corrector 274 controls the output signal controller 214, thereby causing the output signal controller 214 to perform a correction process on the one of the video signal and the audio signal to be output to the outside. More specifically, the signal corrector 274 controls the output signal controller 214, thereby causing the output signal controller 214 to perform a field interpolation process on the video signal to be output to the outside.

The frame counter manager 275 manages the reproduction frame counter and the read frame counter.

The data reading controller 262 controls the medium recorder 211, thereby causing the medium recorder 211 to read data at the recording position of the recording medium 102 indicated by the recording position information and causing the stream buffer 212 to store the data. When the recording medium 102 is loaded onto the medium recorder 211, the data reading controller 262 controls the medium recorder 211, thereby causing the medium recorder 211 to read the management information file from the recording medium 102. The data reading controller 262 retrieves the management information file from the medium recorder 211 via the signal line 216 and causes the RAM 243 to store the management information file.

The information retriever 263 retrieves the navigation information and the provider definition information of the AV stream from the data recorded on the stream buffer 212, and causes the RAM 243 to store the retrieved navigation information and provider definition information.

The process of the reproducing apparatus 201 is described with reference to FIGS. 13 through 17. Unless otherwise noted in the following discussion, the AV stream recorded on the recording medium 102 complies with the DVD-Video format.

The reproduction process of the reproducing apparatus 201 is described below with reference to flowcharts of FIGS. 13 and 14. This process is initiated when a user enters a start command of the recording process by operating the input and output interface 244 and a command signal to start the reproduction process is issued from the output signal controller 214 to the reproduction position setter 271 via the bus 245 (hereinafter referred to as a reproduction start signal).

When the recording medium 102 is loaded onto the medium recorder 211, the data reading controller 262 controls the medium recorder 211, thereby causing the medium recorder 211 to read the management information (IFO) file containing the management information from the recording medium 102. The data reading controller 262 retrieves the management information file from the medium recorder 211 via the signal line 216, and stores the management information file on the RAM 243.

In step S101, the reproduction position setter 271 determines a reproduction start position. More specifically, the reproduction position setter 271 determines a chapter on the AV stream specified by the user in the reproduction operation, based on the reproduction start signal and the management information, and determines reproduction start time in time axis of the AV stream of the chapter based on the management information. For example, if the user specifies a resume reproduction inode, the reproduction position setter 271 determines the reproduction start time by reading information related to start time in time axis of the AV stream that starts at start time of a next reproduction process. The AV stream was stored in the RAM 243 when a preceding reproduction operation stopped.

In step S102, the reproduction position setter 271 determines the recording position (reproduction position) of the AV stream (VOBU) that starts on the recording medium 102, from the reproduction start time of the AV stream determined in step S101 based on the management information. The reproduction position setter 271 then supplies the recording position information to the data reading controller 262.

In step S103, the data reading controller 262 determines whether the VOBU immediately prior to the reproduction position needs to be read to reproduce the VOBU at the reproduction position.

For example, if the AV stream has been recorded in accordance with the DVD-Video format, the data reading controller 262 determines, based on control information, whether the VOBU at the reproduction position indicated by the recording position information is a front end VOBU of the chapter. In the DVD-Video format, the video data of the front end VOBU of the chapter is encoded without using the immediately prior VOBU. The immediately prior VOBU is not used in the decoding of the video data of that VOBU. If the VOBU at the reproduction position is the one at the front end of the chapter, it is thus determined there is no possibility that the reading of the immediately prior VOBU from the recording medium 102 is required.

If the VOBU at the reproduction position is not the one at the front end of the chapter, the video data of the VOBU can have been encoded using the video data of the immediately prior VOBU. To decode the video data of the VOBU, the immediately prior VOBU may be used. If the VOBU at the reproduction position is not the one at the front end of the chapter, it is thus determined there is a possibility that the reading of the immediately prior VOBU from the recording medium 102 is required.

For example, if the AV stream has been recorded in accordance with the DVD-VR format, the data reading controller 262 determines, based on control information, whether the VOBU at the reproduction position indicated by the recording position information is the one at a front end of a cell, and determines whether a VOBU not referenced from the cell contained in the VOBU is present in the front of a VOB containing the VOBU. If the value of the closed GOP flag of the GOP of the VOBU at the front end of the cell in the DVD-VR format is 0, a VOBU containing the video data used to encode the video data of the VOBU is arranged at the front end of the VOB as the VOBU not referenced from the cell. The control information contains information indicating whether the VOBU not referenced from the cell is present at the front end of each VOB.

If the VOBU at the reproduction position is at the front end of the cell, and the VOBU not referenced from the cell is present at the front end of the VOB containing the VOBU, there is a possibility that the video data of the VOBU at the reproduction position has been encoded using the video data of the immediately prior VOBU. To decode the video data, the video data of the immediately prior VOBU may need to be used. It is thus determined that there is a possibility that the reading of the VOBU immediately prior to the reproduction position from the recording medium 102, namely, the VOBU not referenced from the cell is needed.

If the VOBU at the reproduction position is not at the front end of the cell, or if the VOBU not referenced from the cell is not present at the front end of the VOB containing the VOBU, there is no possibility that the video data of the VOBU at the reproduction position has been encoded using the video data of the immediately prior. VOBU. To decode the video data, the video data of the immediately prior VOBU does not need to be used. It is thus determined that there is no possibility that the reading of the VOBU immediately prior to the reproduction position from the recording medium 102 is needed.

If it is determined in step S103 that there is a possibility that the reading of the VOBU immediately prior to the reproduction position is needed, processing proceeds to step S104.

In step S104, the medium recorder 211 under the control of the data reading controller 262 reads the navigation information (NV_PCK) and the provider definition information (ARI_PCK) of the VOBU at the reproduction position from the recording medium 102. More specifically, the data reading controller 262 supplies the recording position information of the VOBU at the reproduction position to the medium recorder 211 via the signal line 216. The medium recorder 211 under the control of the data reading controller 262 reads the navigation information and the provider definition information of the VOBU at the reproduction position from the recording position at the recording medium 102 specified by the recording position information. The medium recorder 211 supplies the read navigation information and provider definition information to the stream buffer 212 for storage.

The navigation information and the provider definition information of the VOBU at the reproduction position are read from the recording medium 102 prior to the reading of V_PCK, A_PCK, and S_PCK.

The information retriever 263 retrieves the navigation information and the provider definition information of the VOBU at the reproduction position from the stream buffer 212 via the signal line 217, and stores the navigation information and the provider definition information of the VOBU at the reproduction position on the RAM 243.

Figure 15:
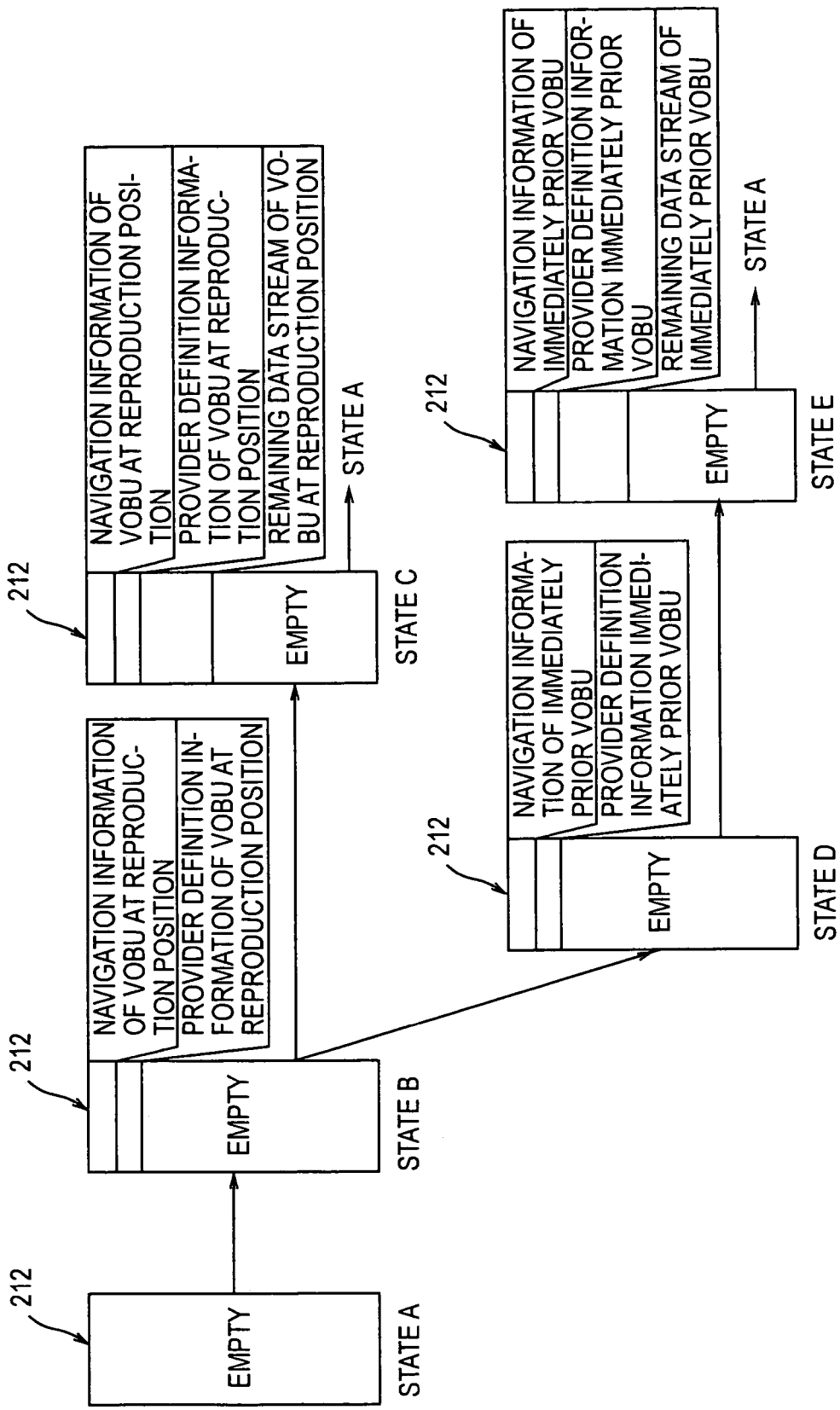
FIG. 15 illustrates state transition of a stream buffer.

As shown in FIG. 15, in step S104, the stream buffer 212 is transitioned from a state A having nothing stored to a state B where the navigation information and the provider definition information of the VOBU at the reproduction position are stored.

If the AV stream is recorded in accordance with the DVD-VR format, RDI_PCK is read from the recording medium 102 in step S104, and is then stored onto the stream buffer 212 and the RAM 243.

In step S105, the data reading controller 262 determines whether the reading of the immediately prior VOBU is needed. More specifically, the data reading controller 262 references the values of the closed GOP flag and the broken link flag held in the provider definition information of the VOBU at the reproduction position. If the closed GOP flag is off and the broken link flag is off, the video data of the immediately prior VOBU needs to be used to decode the video data of the VOBU at the reproduction position. If it is determined that the reading of the immediately prior VOBU is needed, and processing proceeds to step S106.

In step S106, the medium recorder 211 under the control of the data reading controller 262 reads the navigation information and the provider definition information of the VOBU immediately prior to the reproduction position in the same process as in step S104. The medium recorder 211 under the control of the data reading controller 262 supplies the read navigation information and provider definition information to the stream buffer 212, and overwrites the read navigation information and provider definition information at the reproduction position stored on the stream buffer 212 for storage. Through this process, the stream buffer 212 is transitioned from the state B of FIG. 15 to a state D where the navigation information and provider definition information of the VOBU immediately prior to the reproduction position are stored.

The information retriever 263 retrieves the navigation information and provider definition information of the VOBU immediately prior to the reproduction position from the stream buffer 212 via the signal line 217 and stores the navigation information and provider definition information of the VOBU immediately prior to the reproduction position onto the RAM 243.

In step S107, the medium recorder 211 reads under the control of the data reading controller 262 reads the data stream of the VOBU immediately prior to the reproduction position from the recording medium 102. More specifically, the data reading controller 262 controls the medium recorder 211 based on the control information and the navigation information, thereby causing the medium recorder 211 to read the data stream in succession to the provider definition information of the VOBU immediately prior to the reproduction position (V_PCK, A_PCK, and S_PCK) from the recording medium 102 and causing the stream buffer 212 to store the read data stream. Through this process, the stream buffer 212 is transitioned from the state D of FIG. 15 to a state E where the navigation information, the provider definition information, and the data stream of the VOBU immediately prior to the reproduction position, namely, all data of the VOBU immediately prior to the reproduction position is stored.

In step S108, the processor 241 performs the reproduction process of the VOBU immediately prior to the reproduction position. More specifically, the demultiplexer 231 under the control of the output signal generation controller 272 retrieves the immediately prior VOBU stored on the stream buffer 212, demultiplexes the data stream of the retrieved VOBU into the video stream and the audio stream, supplies the video stream to the video decoder 232, and the supplies audio stream to the audio decoder 233.

The video decoder 232 under the control of the output signal generation controller 272 decodes the supplied video stream, and supplies the decoded video stream to the output signal controller 214. The audio decoder 233 under the control of the output signal generation controller 272 decodes the supplied audio stream and supplies the decoded audio stream to the output signal controller 214. The output signal controller 214 under the control of the output controller 273 performs a control process not to output the video signal and the audio signal to the outside. More specifically, video and audio based on the AV stream of the immediately prior VOBU are neither displayed on nor output to an external display.

The VOBU, read by the demultiplexer 231, immediately prior to the reproduction position is deleted from the stream buffer 212. The stream buffer 212 is transitioned from the state E of FIG. 15 to the state A. Processing proceeds to step S109.

If it is determined in step S103 that there is no possibility that the reading of the VOBU immediately prior to the reproduction position is needed, processing proceeds to step S109 with steps S104 through S108 skipped. The reading of and the reproduction process of the VOBU immediately prior to the reproduction position are not performed.

In step S109, the navigation information and provider definition information of the VOBU at the reproduction position are read from the recording medium 102 in the same way as in step S104, and then stored on the stream buffer 212 and the RAM 243. Through this process, the stream buffer 212 is transitioned from the state A of FIG. 15 to the state B. Processing proceeds to step S110.

If it is determined in step S110 that the reading of the VOBU immediately prior to the reproduction position is not needed, processing proceeds to step S110 with steps S106 through S109 skipped. In other words, the reading of and the reproduction process of the VOBU immediately prior to the reproduction position is not performed.

In step S110, the frame counter manager 275 updates the reproduction frame counter and the read frame counter. More specifically, the frame counter manager 275 adds to the count of the reproduction frame counter the number of reproduction frames recorded in the provider definition information of the VOBU at the reproduction position, adds to the count of the read frame counter the number of real frames recorded in the provider definition information of the VOBU at the reproduction position, and stores the counts of the reproduction frame counter and the count of the read frame counter onto the RAM 143. The frame counter manager 275 causes the RAM 243 to store the range of the counter of the reproduction frame counter and the counter of the read frame counter assigned to the video data contained in the VOBU at the reproduction position.

Unlike the known reproducing apparatus, the reproducing apparatus of the embodiment of the present invention is free from calculating the count of the reproduction frame counter from the reproduction time of the GOP, managing the process frame counter (read frame counter) with the video decoder 232, and supplying the process frame counter from the video decoder 232 to the processor 241 via the signal line 218. With a simple process, the reproduction frame counter and the read frame counter are managed.

In step S111, the signal corrector 274 checks to see if there is any change in the scanning method (progressive frame flag) of the video data between the VOBU at the reproduction position and the (currently reproduced) VOBU immediately prior to the reproduction position, based on the progressive frame information contained in the provider definition information.

In step S112, the signal corrector 274 determines, based on the results of the determination in step S111, whether the scanning method of the video data is changed from the (currently reproduced) VOBU immediately prior to the reproduction position. If it is determined that the scanning method of the video data has changed, processing proceeds to step S113.

In step S113, the signal corrector 274 commands the output signal controller 214 to change the scanning method. More specifically, the output controller 273 supplies, to the output signal controller 214 via the signal line 219, the count of the reproduction frame counter of the frame at which the scanning method is changed, and information indicative of the scanning method of that frame (scanning method modification information). Processing proceeds to step S114.

If it is determined in step S112 that the scanning method of the video data is not changed, processing proceeds to step S114 with step S113 skipped.

In step S114, the remaining data stream of the VOBU at the reproduction position is read from the recording medium 102 in the same way as in step S107, and then stored on the stream buffer 212. Through this process, the stream buffer 212 is transitioned from the state B of FIG. 13 to the state C where the navigation information, the provider definition information and the data stream of the VOBU at the reproduction position, namely, all data of the VOBU at the reproduction position is stored.

In step S115, the processor 241 performs the reproduction process on the VOBU at the reproduction position. More specifically, the demultiplexer 231 under the control of the output signal generation controller 272 reads the VOBU at the reproduction position stored on the stream buffer 212, demultiplexes the stream data of the read VOBU into the video stream and the audio stream, supplies the video stream to the video decoder 232, and supplies the audio stream to the audio decoder 233.

The video decoder 232 under the control of the output signal generation controller 272 decodes the video stream, and supplies the decoded video stream to the output signal controller 214. The audio decoder 233 under the control of the output signal generation controller 272 decodes the audio stream, and supplies the decoded audio stream to the output signal controller 214. As necessary, the video decoder 232 decode the video data of the VOBU at the reproduction position using the video data of the immediately prior VOBU retrieved in step S108.

The output signal controller 214 under the control of the output controller 273 outputs the video signal and the audio signal to an external display to display a video based on the video signal and to output an audio based on the audio signal.

If the scanning method modification information is received in step S113, the output signal controller 214 corrects the video signal when the video signal of the frame with the scanning method changed is output, and outputs the corrected video signal to the external display. More specifically, if the scanning method is changed from the progressive method to the interlace method in the middle of slow reproduction, the outputting of the field interpolated video signal having the upper field and the lower field synthesized therewithin starts in synchronization with the switching of the frame of the output video signal to the interlace method. Conversely, if the scanning method is changed from the interlace method to the progressive method, the field interpolation process performed on the output video signal is stopped in synchronization with the switching of the frame of the output video signal to the progressive method, and the video signal is output as is.

Since the scanning method of the video data can be learned before the decoding of the video stream, the switching of the field interpolation to be performed on the video signal is reliably performed at the same time as the scanning method of the frame of the output video signal is switched.

The output signal controller 214 updates the output frame counter by adding to the count of the current output frame counter the number of frames of the output video.

The VOBU at the reproduction position read by the demultiplexer 231 is deleted from the stream buffer 212 and the medium recorder 211 is transitioned from the state C of FIG. 15 to the state A.

In step S116, the reproduction position setter 271 determines whether a command to modify the reproduction position has been issued. More specifically, the reproduction position setter 271 determines that a command to modify the reproduction position has been issued if the user specifies a chapter to be reproduced to modify the reproduction position using the input and output interface 244 and then if the reproduction position modification signal is supplied from the input and output interface 244 to the reproduction position setter 271 via the bus 245. If the reproduction position modification signal is not supplied, the reproduction position setter 271 determines the command to modify the reproduction position has not been issued. If it is determined that the command to modify the reproduction position has not been issued, processing proceeds to step S117.

In step S117, the reproduction position setter 271 advances the reproduction position by one notch. More specifically, the reproduction position setter 271 determines the recording position (reproduction position) of the VOBU to be reproduced next, based on the management information, and supplies the data reading controller 262 with the recording position information of the VOBU to be reproduced next.

Returning to step S103, the above-described process steps are repeated. If the AV stream is recorded in accordance with the DVD-Video format, the video decoder 232 is already supplied with the video data of the VOBU immediately prior to the reproduction position in step S115. From a second cycle on in step S103, even if the VOBU at the reproduction position is not in the front end of the chapter, it is determined that there is no possibility that the reading of the VOBU immediately prior to the reproduction position is needed. Processing proceeds to step S109 with steps S104 through S108 skipped.

If the AV stream is recorded in accordance with the DVD-VR format, the same determination process as in the first cycle is performed in step S103 in the second and subsequent cycles.

If it is determined in step S116 that the command to modify the reproduction position has been issued, processing returns to step S101 to repeat the above-described process steps. If the reproduction position has been modified, time required from the issue of the command to modify the reproduction position to the start of the displaying of the video at the commanded reproduction position is shortened in the same manner as in the reproduction start process. This is because the reading and the reproduction process of the immediately prior VOBU in steps S106 through S108 are skipped when the VOBU at the reproduction position, the modification of which is requested, needs no reference to the VOBU at the reproduction position.

The provider definition information related to the video data contained in the video stream multiplexed into the AV stream is easily retrieved before the decoding of the video stream.

Before the decoding of the VOBU at the reproduction position, whether the video data of the VOBU at the reproduction position can be decoded without using the video data of the VOBU immediately prior to the reproduction position is determined based on the closed GOP information and the broken link information recorded on the provider definition information. If it is determined that the video data of the VOBU at the reproduction position can be decoded without using the video data of the VOBU immediately prior to the reproduction position, the reading and the reproduction process of the VOBU immediately prior to the reproduction position are skipped. In this way, time required to display the video is shortened during the reproduction start process or the reproduction position modification process. The video is thus quickly displayed.

Since the video data (frame) with the scanning method thereof changed is identified based on the progressive frame information recorded on the provider definition information before the decoding of the video stream, the correction process of the video signal is reliably switched in synchronization with the change of the scanning method of the video data. More specifically, if the command to change the scanning method has been issued, the field interpolation can be reliably started at the video on which the change of the scanning method is intended. As a result, the video is prevented from being disarrayed at the switching of the scanning method, and becomes easy to view.

With a simple process, the reproduction frame counter and the read frame counter are managed.

The reproduction speed modification process to be performed by the reproducing apparatus 201 is described below with reference to flowcharts of FIGS. 16 and 17. This process is initiated when a user enters a modification command of modifying the reproduction speed in the currently reproduced AV stream by operating the input and output interface 244 and a reproduction speed modification signal is supplied from the input and output interface 244 to the reproduction position setter 271 via the bus 245.

In step S151, the reproduction position setter 271 determines whether the user has issued a reproduction command to reproduce the I picture. If the reproduction speed instructed by the user is found to be the reproduction speed of the I picture reproduction based on the reproduction speed modification signal, the reproduction position setter 271 determines that the command to reproduce the I picture has been issued, and then proceeds to step S152.

In step S152, the reproduction position setter 271 determines whether the I picture is currently reproduced. If it is determined that the I picture is currently reproduced, in other words, the I pictures are reproduced continuously even after the modification of the reproduction speed, processing proceeds to step S153.

In step S153, the reproduction position setter 271 determines based on the reproduction speed modification information that a modification command to modify the direction of reproduction of the AV stream has been issued. If it is determined that the modification command to modify the reproduction direction has been issued, in other words, if the reproduction direction is changed from a forward direction (a future direction in time axis of the AV stream) to a reverse direction (a past direction in the time axis of the AV stream) or vise versa, processing proceeds to step S154.

If it is determined in step S152 that all-frame reproduction is currently performed, in other words, if the I picture reproduction resumes subsequent to the reproduction speed modification in succession to the current all-frame reproduction, processing proceeds to step S154 with step S153 skipped.

In step S154, the reproduction position setter 271 determines the reproduction order within the VOBU of the video data of the currently displayed video (hereinafter referred to as display video VOBU reproduction order). More specifically, the reproduction position setter 271 retrieves information regarding the count of the output frame counter from the output signal controller 214 via the signal line 219. The reproduction position setter 271 determines the display video VOBU reproduction order based on the information regarding the count of the reproduction frame counter assigned to each VOBU and stored on the RAM 243.

In step S155, the reproduction position setter 271 determines based on the reproduction speed modification signal whether the reproduction direction commanded by the user is forward or reverse. If it is determined that the reproduction direction is forward, processing proceeds to step S156.

In step S156, the reproduction position setter 271 determines whether an I picture to be reproduced is present in the currently reproduced VOBU subsequent to the currently displayed video data (in the future direction in the time axis). With reference to FIGS. 13 and 14, the navigation information and the provider definition information of the currently reproduced VOBU are stored on the RAM 243. Based on the video VOBU reproduction order determined in step S154 and the I picture reproduction order information recorded in the provider definition information, the reproduction position setter 271 determines whether an I picture to be reproduced subsequent the video data of the currently displayed video is present in the currently reproduced VOBU. If it is determined that an I picture to be reproduced subsequent the video data of the currently displayed video is present in the currently reproduced VOBU, processing proceeds to step S157.

In step S157, the medium recorder 211 under the control of the data reading controller 262 reads the I picture of the currently reproduced VOBU, and stores the read I picture onto the stream buffer 212. More specifically, information regarding the recording position of the I picture contained in each VOBU is contained in the navigation information of the VOBU. Based on the navigation information, the data reading controller 262 controls the medium recorder 211, thereby reading only the I picture of the currently reproduced VOBU from the recording medium 102, and storing the read I picture onto the stream buffer 212. Processing then proceeds to step S163.

If it is determined in step S156 that no I picture to be reproduced subsequent to the video data of the currently displayed video is present in the currently reproduced VOBU, processing then proceeds to step S158.

Figure 13:
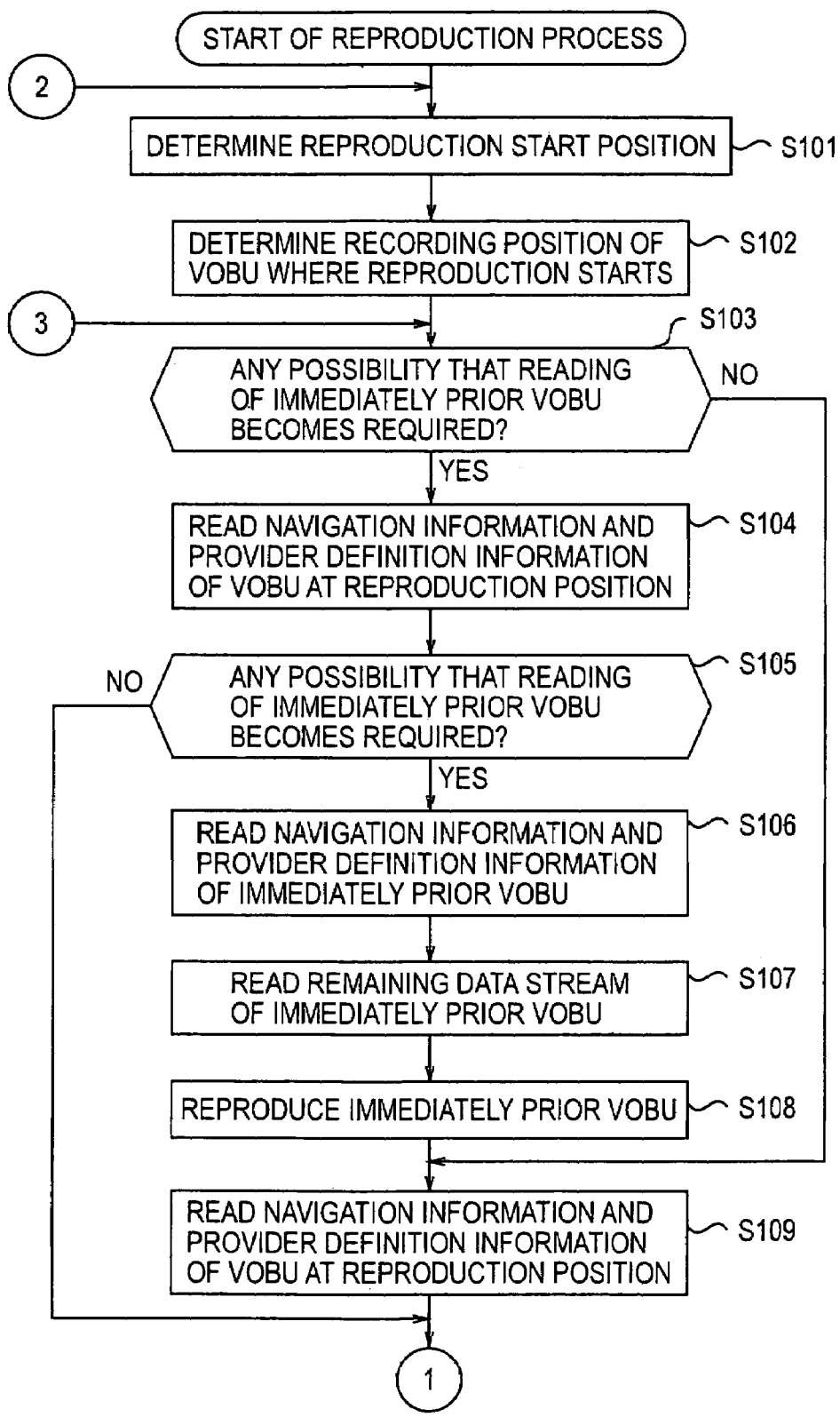
FIG. 13 is a flowchart illustrating a reproduction process of the reproducing apparatus of FIG. 11.
Figure 14:
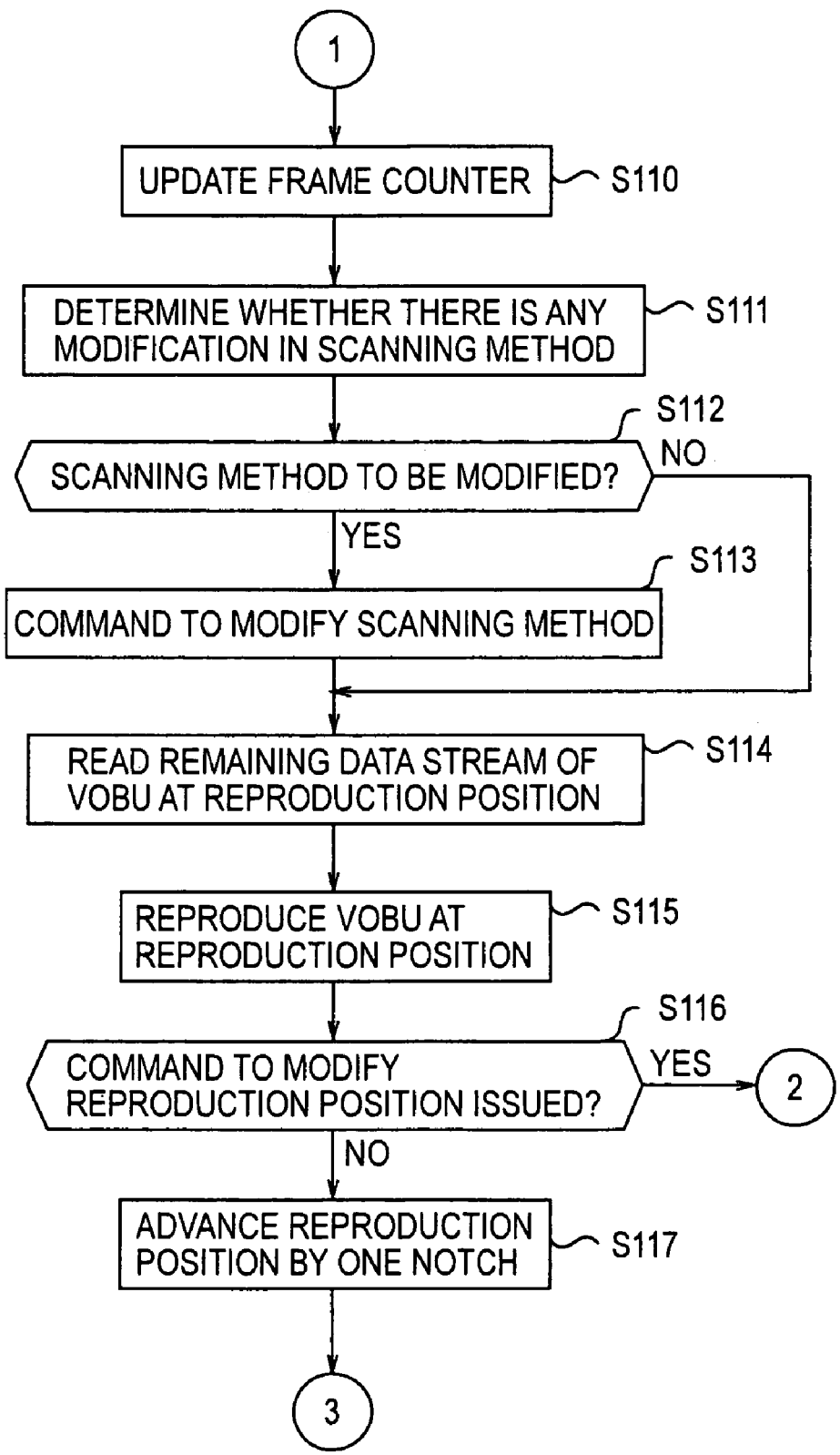
FIG. 14 is a flowchart illustrating a reproduction process of the reproducing apparatus of FIG. 11.

In step S158, as in step S104 of FIG. 13, the navigation information and the provider definition information of the VOBU to be reproduced subsequent to the currently reproduced VOBU are read from the recording medium 102, and then stored onto the stream buffer 212 and the RAM 243.

In step S159, as in step S157, the I picture of the VOBU to be reproduced next is read from the recording medium 102, and then stored onto the stream buffer 212. Processing then proceeds to step S163.

If it is determined in step S155 that the reproduction direction is reverse, processing proceeds to step S160.

Based on the display video VOBU reproduction order determined in step S154, and the I picture reproduction order information recorded in the provider definition information, the reproduction position setter 271 determines in step S160 whether an I picture to be reproduced prior to the currently displayed video is present in the currently reproduced VOBU. If it is determined that an I picture to be reproduced prior to the currently displayed video is present in the currently reproduced VOBU, processing proceeds to step S161.

In step S161, as in step S104 of FIG. 13, the navigation information and the provider definition information of the VOBU to be produced immediately prior to the currently reproduced VOBU are read from the recording medium 102 and then stored onto the stream buffer 212 and the RAM 243.

In step S162, as in step S157, the I picture of the VOBU to be reproduced immediately prior to the currently reproduced VOBU is read from the recording medium 102 and then stored onto the stream buffer 212. Processing then proceeds to step S163.

If it is determined in step S160 that an I picture to be reproduced prior to the currently displayed video is present in the currently reproduced VOBU, processing proceeds to step S157. As previously described, the I picture of the currently reproduced VOBU is read from the recording medium 102 and stored onto the stream buffer 212 in step S157.

In step S163, the processor 241 starts reproducing the I picture, and ends the reproduction speed modification process. More specifically, the demultiplexer 231 under the control of the output signal generation controller 272 reads the I picture stored on the stream buffer 212, and supplies the read I picture to the video decoder 232. The video decoder 232 under the control of the output signal generation controller 272 decodes the I picture and supplies the decoded video signal to the output signal controller 214.

The output signal controller 214 under the control of the output controller 273 outputs the acquired video signal to an external display to display the video responsive to the video signal (video responsive to the I picture).

If the reproduction direction is forward, the I picture of the VOBU to be reproduced subsequent to the VOBU containing the currently reproduced I picture is read from the recording medium 102 and the video responsive to the I picture is displayed in the same way as in steps S158, S159, and S163. This series of steps is repeated with a period depending on the reproduction speed commanded by the user until the user inputs a stop command to stop the reproduction process or a modification command to modify the reproduction speed by operating the input and output interface 244.

If the reproduction direction is reverse, the I picture of the VOBU to be reproduced prior to the VOBU containing the currently reproduced I picture is read from the recording medium 102 and the video responsive to the I picture is displayed in the same way as in steps S161 through S163. This series of steps is repeated with a period depending on the reproduction speed commanded by the user until the user inputs a stop command to stop the reproduction process or a modification command to modify the reproduction speed by operating the input and output interface 244.

If it is determined in step S153 that a modification command to modify the reproduction direction has not been issued, in other words, if a reproduction speed modification command is issued to modify the reproduction speed without switching the modification method (between the I picture reproduction and the all-frame reproduction) and without changing the reproduction direction, processing proceeds to step S164.

In step S164, the processor 241 modifies the reproduction speed, thereby ending the reproduction speed modification process. More specifically, the demultiplexing and decoding processor 213 under the control of the output signal generation controller 272 demultiplexes the AV stream, decodes the video stream and the audio stream, and modifies the period of the supplying of the video signal and the audio signal to the period based on the reproduction speed commanded by the reproduction speed modification command. The output signal controller 214 under the control of the output controller 273 modifies the output period of one of the video signal and the audio signal to the period based on the reproduction speed commanded by the preproduction speed modification command.

If it is determined in step S151 that no command to reproduce the I picture has been issued, in other words, the reproduction speed commanded by the user is a reproduction speed of the all-frame reproduction, processing proceeds to step S165.

In step S165, as in step S152, it is determined whether an I picture is currently reproduced. If it is determined that an I picture is currently reproduced, in other words, if the all-frame reproduction resumes subsequent to the reproduction speed modification with the I picture currently being reproduced, processing proceeds to step S166.

In step S166, as in step S114 of FIG. 13, the VOBU containing the currently reproduced I picture, namely, the data stream (V_PCK, A_PCK, and S_PCK) of the VOBU of the current reproduction position other than the navigation information and the provider definition information is read from the recording medium 102, and the read data stream is stored onto the stream buffer 212.

In step S167, the processor 241 starts reproducing the VOBU read from the recording medium 102 in step S166 with the currently displayed video held. More specifically, the demultiplexer 231 under the control of the of the output signal generation controller 272 reads the VOBU stored on the stream buffer 212, demultiplexes the data stream of the read VOBU into the video stream and the audio stream, supplies the video stream to the video decoder 232 and supplies the audio stream to the audio decoder 233.

The video decoder 232 under the control of the output signal generation controller 272 decodes the supplied video stream, and supplies the decoded video signal to the output signal controller 214. The audio decoder 233 under the control of the output signal generation controller 272 decodes the supplied audio stream and supplies the decoded audio signal to the output signal controller 214. The output signal controller 214 under the control of the output controller 273 continuously outputs the video signal of the currently displayed video (with the video held) without outputting the acquired video signal and audio signal to the outside.

The output controller 273 releases the held display of the video when the reproduction process reaches the video data of the currently displayed video in step S168. The reproduction speed modification process then ends. More specifically, when the reproduction process of the VOBU started in step S167 advances to the video data of the currently held video, the output signal controller 214 under the control of the output controller 273 starts outputting to an external display the video signal supplied from the video decoder 232 and the audio signal supplied from the audio decoder 233. In this way, the currently display held video is released, and the displaying of the video responsive to the video signal and the outputting of the audio responsive to the audio signal resume.

The AV stream is reproduced at the reproduction speed commanded by the user until the user enters a stop command to stop the reproduction process or a modification command to modify the reproduction speed by operating the input and output interface 244.

If it is determined in step S165 that the all-frame reproduction is currently operating, in other words, if the all-frame reproduction is performed even after the modification of the reproduction speed, processing proceeds to step S169.

In step S169, as in step S164, the reproduction speed is modified and the speed modification process then ends.

The AV stream is reproduced at the reproduction speed commanded by the user until the user enters a stop command to stop the reproduction process or a modification command to modify the reproduction speed by operating the input and output interface 244.

This simple process determines whether an I picture to be reproduced subsequent to the video data of the currently reproduced video is present in the same VOBU as the video data of the currently displayed video in the reproduction direction of the current AV stream. Even if the all-frame reproduction is switched to the I picture reproduction in response to the reproduction speed modification, the I picture to be reproduced subsequent to the video data of the currently displayed video, present in the same VOBU as the video data of the currently displayed video in the reproduction direction of the current AV stream, is reliably reproduced without being skipped. A specified video is thus reliably reproduced. As a result, the flow of video looks smooth and becomes easy to view.

In the recording of the video stream to be recorded onto the data recording medium on a per data segment basis, control process is performed to generate additional data, separate from the video stream, containing additional information regarding the relationship between the video data contained in one data segment and the video data contained in another data segment or additional information regarding characteristics of the video data contained in each data segment, to multiplex additional data with the data segment at a predetermined position thereof, and to record the data segment onto the data recording medium. The video stream is thus recorded onto the data recording medium. The reproducing apparatus records the video stream onto the recording medium in a simple process.

In the reproduction process of a video stream that has been recorded on the data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment, the reading of data from the data recording medium is controlled so that the additional data contained in the data segment containing the video data to be reproduced is read from the data recording medium prior to the reading of the video data, and the reproduction of the video data is controlled based on the additional information contained in the read additional data. The video stream recorded on the data recording medium is reproduced. The video stream recorded on the data recording medium is reproduced in the simple process.

As a result, a specified video is more reliably reproduced. The video is reproduced more quickly.

In the above discussion, the provider definition information is read from the recording medium 102 so that the processor 241 retrieves the provider definition information before V_PCK, A_PCK, and S_PCK are read from the recording medium 102. Alternatively, all data of the VOBU may be read from the recording medium 102 and the processor 241 may retrieve (extract) the provider definition information from the read VOBU.

The above-referenced series of process steps may be performed by hardware or software.

If the series of process steps of the recording apparatus 101 is performed by software, the control program is supplied in the ROM 142. Alternatively, the control program may be received via the input and output interface 144 from a server connected to a network. Alternatively, the removable medium 152 having the control program recorded thereon is supplied and then loaded onto the drive 151. The control program is read from the removable medium 152 and then installed onto one of the ROM 142 and the RAM 143.

If the series of process steps of the recording apparatus 201 is performed by software, the control program is supplied in the ROM 242. Alternatively, the control program may be received via the input and output interface 244 from a server connected to a network. Alternatively, the removable medium 252 having the control program recorded thereon is supplied and then loaded onto the drive 251. The control program is read from the removable medium 252 and then installed onto one of the ROM 242 and the RAM 243.

In the description, the steps of the program stored in the program recording medium are performed in time series order stated herein. Alternatively, the steps may be performed in parallel or separately.

The invention claimed is:

1. A recording apparatus for dividing a video stream into data segments, each data segment containing at least one frame of video data, and recording data onto a data recording medium on a per data segment basis, comprising:

information generating means for generating additional data, separate from the video stream, containing additional information regarding the relationship between the video data contained in one data segment and the video data contained in another data segment or additional information regarding characteristics of the video data contained in each data segment wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment;

multiplexing means for multiplexing the additional data with the data segment at a predetermined position thereof; and recording control means for controlling the recording of the data segment onto the data recording medium.

2. The recording apparatus according to claim 1, wherein the video stream is a video stream that has been encoded in compliance with MPEG (Moving Picture Experts Group) 2, and wherein the data segment is a VOBU (Video Object Unit).

3. The recording apparatus according to claim 2, wherein the additional information comprises at least one piece of information equivalent to a closed GOP (Group of Pictures) flag, information equivalent to a broken link flag, information regarding a reproduction order of I-pictures in the VOBU, the number of frames of video to be reproduced by the VOBU, the number of pages of video data contained in the VOBU, and information equivalent to a progressive frame flag.

4. A recording method of dividing a video stream into data segments, each data segment containing at least one frame of video data, and recording data onto a data recording medium on a per data segment basis, comprising:

generating additional data, separate from the video stream, containing additional information regarding the relationship between the video data contained in one data segment and the video data contained in another data segment or additional information regarding characteristics of the video data contained in each data segment wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment;

multiplexing the additional data with the data segment at a predetermined position thereof; and controlling the recording of the data segment onto the data recording medium.

5. A computer program product, said computer program product comprising a computer readable medium including program code stored thereon, said program code being executable for causing a recording apparatus to perform a recording process, the recording apparatus dividing a video stream into data segments, each data segment containing at least one frame of video data, and recording data onto a data recording medium on a per data segment basis, said recording process comprising:

generating additional data, separate from the video stream, containing additional information regarding the relationship between the video data contained in one data segment and the video data contained in another data segment or additional information regarding characteristics of the video data contained in each data segment wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment;

multiplexing the additional data with the data segment at a predetermined position thereof; and controlling the recording of the data segment onto the data recording medium.

6. A reproducing apparatus for reproducing a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment, comprising:

reading control means for controlling the reading of data from the data recording medium so that the additional data contained in the data segment containing the video data to be reproduced is read from the data recording medium prior to the reading of the video data wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment; and reproduction control means for controlling the reproducing of the video data based on the additional information contained in the read additional data.

7. The reproducing apparatus according to claim 6, wherein the additional information comprises decode information indicating whether to use video data contained in another data segment when the video data contained in one data segment is decoded, and wherein the reading control means controls the reading of the other data segment from the data recording medium based on the decode information when the video data contained in the one data segment is to be decoded.

8. The reproducing apparatus according to claim 7, wherein the video stream is a video stream that has been encoded in compliance with MPEG (Moving Picture Experts Group) 2, the data segment is a VOBU (Video Object Unit), and the decode information is information equivalent to a closed GOP (Group of Pictures) flag or information equivalent to a broken link flag.

9. The reproducing apparatus according to claim 6, wherein the additional information is video data contained in the data segment, and contains reproduction order information regarding a reproduction order of the video data that is to be accessed when the video stream is randomly accessed, and wherein the reproduction control means comprises reproduction order control means for controlling the reproduction order of the video data based on the reproduction order information.

10. The reproducing apparatus according to claim 9, wherein the video stream is a video stream that has been encoded in compliance with MPEG (Moving Picture Experts Group) 2, the data segment is a VOBU (Video Object Unit), and the reproduction order information is information regarding the reproduction order of I-pictures in the VOBU.

11. The reproducing apparatus according to claim 6, wherein the additional information comprises video data amount information regarding an amount of video data contained in the data segment, and
   wherein the reproduction control means comprises management means for managing the number of frames of video reproduced from the video stream, or the number of pages of video data contained in the video stream based on the video data amount information.

12. The reproducing apparatus according to claim 11, wherein the video stream is a video stream that has been encoded in compliance with MPEG (Moving Picture Experts Group) 2, the data segment is a VOBU (Video Object Unit), and the video data amount information is the number of frames of video reproduced from the VOBU, or the number of pages of video data contained in the VOBU.

13. The reproducing apparatus according to claim 6, wherein the additional information comprises scanning method information regarding a scanning method of the video data contained in the data segment, and
   wherein the reproduction control means comprises correction means for correcting an output signal responsive to the video data based on the scanning method information.

14. The reproducing apparatus according to claim 13, wherein the video stream is a video stream that has been encoded in compliance with MPEG (Moving Picture Experts Group) 2, the data segment is a VOBU (Video Object Unit),
   the scanning method information is information equivalent to a progressive frame flag, and
   the correction means performs field correction on the output signal based on the information equivalent to the progressive frame flag.

15. A reproducing method of reproducing a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment, comprising:
   controlling the reading of data from the data recording medium so that the additional data contained in the data segment containing the video data to be reproduced is read from the data recording medium prior to the reading of the video data
   wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment; and
   controlling the reproducing of the video data based on the additional information contained in the read additional data.

16. A computer program product, said computer program product comprising a computer readable medium including program code stored thereon, said program code being executable for causing a reproducing apparatus to perform a reproducing process, the reproducing apparatus reproducing a video stream that has been recorded on a data recording medium on a data segment by data segment basis, each data segment containing video data of at least one frame of video stream, with additional data placed at a predetermined position of the data segment, the additional data, separate from the video stream, containing additional information regarding the relationship between the video data contained in one data segment and the video data contained in another data segment or additional information regarding characteristics of the video data contained in each data segment, said recording process comprising
   controlling the reading of data from the data recording medium so that the additional data contained in the data segment containing the video data to be reproduced is read from the data recording medium prior to the reading of the video data
   wherein the additional information comprises at least one piece of decode information indicating whether to use video data contained in another data segment when the video data contained in one data segment is decoded, reproduction order information relating to a reproduction order of the video data that is contained in the data segment and is to be accessed when the video stream is randomly accessed, video data amount information regarding an amount of video data contained in the data segment, and scanning method information regarding a scanning method of the video data contained in the data segment; and
   controlling the reproducing of the video data based on the additional information contained in the read additional data.

* * * * *